(12) United States Patent
    Tsuboi et al.

(10) Patent No.: US 10,746,072 B2
(45) Date of Patent: Aug. 18, 2020

(54) ENGINE WITH EXHAUST EMISSION CONTROL DEVICE

(71) Applicant: Mazda Motor Corporation, Aki-gun, Hiroshima (JP)

(72) Inventors: Goro Tsuboi, Hiroshima (JP); Kazuma Uchiyama, Aki-gun (JP); Daishi Ikeda, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 11 days.

(21) Appl. No.: 16/148,318

(22) Filed: Oct. 1, 2018

(65) Prior Publication Data

US 2019/0107024 A1    Apr. 11, 2019

(30) Foreign Application Priority Data

Oct. 5, 2017  (JP) .................................. 2017-195216

(51) Int. Cl.
    *F01N 3/20*     (2006.01)
    *F01N 3/08*     (2006.01)
    (Continued)

(52) U.S. Cl.
    CPC ......... *F01N 3/208* (2013.01); *B01D 53/9418* (2013.01); *B01D 53/9431* (2013.01); *B01D 53/9495* (2013.01); *F01N 3/0807* (2013.01); *F01N 3/0814* (2013.01); *F01N 3/0842* (2013.01); *F01N 3/0871* (2013.01);
    (Continued)

(58) Field of Classification Search
    CPC combination set(s) only.
    See application file for complete search history.

(56) References Cited

U.S. PATENT DOCUMENTS 9,644,513 B2 *   5/2017   Lee .................... F01N 3/0885
9,903,291 B2 *   2/2018   Theis ................. F02D 41/1463
                          (Continued)

FOREIGN PATENT DOCUMENTS

DE    102016200207 A1   7/2016
JP         3518398 B2    4/2004
WO      2014115303 A1    7/2014

OTHER PUBLICATIONS

Japanese Patent Office, Office Action Issued in Application No. 2017195216, dated Mar. 5, 2019, 4 pages.

*Primary Examiner* — Binh Q Tran
(74) *Attorney, Agent, or Firm* — Alleman Hall Creasman & Tuttle LLP

(57) ABSTRACT

An engine includes: an NOx catalyst and an SCR catalyst in an exhaust passage; an excess air ratio change device that changes an excess air ratio of an exhaust gas; and a reducing agent supply device that supplies a reducing agent for SCR including a material for $NH_3$ or $NH_3$ to a portion between the NOx catalyst and the SCR catalyst in the exhaust passages. The engine controls the reducing agent supply device in such a manner that a quantity of the reducing agent for SCR to be supplied from the reducing agent supply device to the exhaust passage 40 becomes small when the excess air ratio of the exhaust gas during regeneration control to regenerate the NOx catalyst is small, as compared to when the excess air ratio λ of the exhaust gas during regeneration control to regenerate the NOx catalyst is large.

6 Claims, 15 Drawing Sheets

(51) Int. Cl.
  *F01N 11/00*    (2006.01)
  *F02D 41/40*    (2006.01)
  *F02D 41/02*    (2006.01)
  *F02P 19/02*    (2006.01)
  *F01N 9/00*     (2006.01)
  *F01N 13/00*    (2010.01)
  *B01D 53/94*    (2006.01)
  *F01N 3/22*     (2006.01)

(52) U.S. Cl.
  CPC ........... *F01N 3/2073* (2013.01); *F01N 3/225* (2013.01); *F01N 9/00* (2013.01); *F01N 11/007* (2013.01); *F01N 13/009* (2014.06); *F02D 41/0245* (2013.01); *F02D 41/0275* (2013.01); *F02D 41/405* (2013.01); *F02P 19/026* (2013.01); *F01N 2610/02* (2013.01); *F01N 2900/0601* (2013.01); *F01N 2900/1402* (2013.01); *F01N 2900/1624* (2013.01); *F02D 41/401* (2013.01); *F02D 2200/0814* (2013.01)

(56) References Cited

U.S. PATENT DOCUMENTS

| | | | | |
|---|---|---|---|---|
| 9,945,277 | B2 * | 4/2018 | Tanaka | F01N 3/101 |
| 10,443,525 | B2 * | 10/2019 | Kanno | F01N 13/009 |
| 10,487,713 | B2 * | 11/2019 | Umemoto | B01D 53/9431 |
| 2015/0322839 | A1 | 11/2015 | Oda et al. | |
| 2016/0290197 | A1 | 10/2016 | Lee et al. | |
| 2016/0290199 | A1 * | 10/2016 | Park | F01N 3/208 |

\* cited by examiner

ENGINE WITH EXHAUST EMISSION CONTROL DEVICE

TECHNICAL FIELD

The present invention relates to an engine with an exhaust emission control device including an NOx catalyst and an SCR catalyst in an exhaust passage.

BACKGROUND ART

It is conventionally known that a catalyst or the like is provided in an exhaust passage in order to purify NOx discharged from an engine.

For example, Japanese Patent No. 3518398 discloses an engine in which an NOx storage and reduction type NOx catalyst is provided in an exhaust passage, and an SCR catalyst is provided downstream of the exhaust passage. The NOx storage and reduction type NOx catalyst stores NOx in an exhaust gas when the exhaust gas is lean where an excess air ratio of the exhaust gas is larger than 1, that is, when an air-fuel ratio of the exhaust gas is larger than a theoretical air-fuel ratio. The NOx storage and reduction type NOx catalyst reduces the stored NOx when the excess air ratio of the exhaust gas is 1 or less. The SCR catalyst purifies NOx in the exhaust gas by reaction with $NH_3$ (ammonia). In this engine, an ammonia compound injection device that injects an ammonia compound serving as a material for $NH_3$ is provided upstream from the SCR catalyst in the exhaust passage. $NH_3$ is generated from the ammonia compound injected by this injection device, and NOx is purified within the SCR catalyst.

SUMMARY OF INVENTION

In the NOx storage and reduction type NOx catalyst, when NOx stored in the NOx catalyst is reduced, "N" in the stored NOx and H, which is an introduced reducing agent, or the like are coupled, thereby generating $NH_3$.

In an engine in which the SCR catalyst is provided downstream from the NOx catalyst and a device that supplies $NH_3$ or a substance serving as a material for $NH_3$ is provided in the exhaust passage, if the engine is configured to simply supply a fixed quantity of $NH_3$ or the substance serving as a material for $NH_3$ to the exhaust passage, a quantity of $NH_3$ to be supplied to the SCR catalyst will be excessive when NOx is reduced by the NOx catalyst. As a result, a lot of $NH_3$ could slip downstream from the SCR catalyst.

In contrast, it can be considered to decrease a quantity of the substance such as $NH_3$ to be supplied to the exhaust passage from the injection device when NOx is reduced by the NOx catalyst or the like. However, if this decrease quantity is not controlled appropriately, a problem that $NH_3$ slips downstream from the SCR catalyst still arises. Alternatively, a problem arises that $NH_3$ to be supplied to the SCR catalyst is insufficient and that NOx is not appropriately purified in the SCR catalyst.

The present invention has been made in view of such circumstances, and it is an object of the present invention to provide an engine with an exhaust emission control device that can inhibit $NH_3$ from slipping downstream from the SCR catalyst while purifying NOx appropriately.

In order to solve the above-described problem, the present invention is an engine with an exhaust emission control device, the engine including: an engine body; a cylinder formed in the engine body; an exhaust passage through which an exhaust gas discharged from the engine body flows; an NOx catalyst provided in the exhaust passage; an SCR catalyst provided downstream from the NOx catalyst; an excess air ratio change device configured to change an excess air ratio of the exhaust gas; a reducing agent supply device configured to supply a reducing agent for SCR including a material for $NH_3$ or $NH_3$ between the NOx catalyst and the SCR catalyst in the exhaust passages; and a control device configured to control the excess air ratio change device and the reducing agent supply device, the control device being configured to execute regeneration control to regenerate the NOx catalyst by setting the excess air ratio of the exhaust gas at 1 or less by the excess air ratio change device, wherein the control device controls the reducing agent supply device in such a manner that a quantity of the reducing agent for SCR to be supplied from the reducing agent supply device to the exhaust passage is becomes small when the excess air ratio of the exhaust gas during the regeneration is small, as compared to when the excess air ratio of the exhaust gas during the regeneration is large.

The present invention provides an engine with an exhaust emission control device, the engine including: an engine body; a cylinder formed in the engine body; an exhaust passage through which an exhaust gas discharged from the engine body flows; an NOx catalyst provided in the exhaust passage; an SCR catalyst provided downstream from the NOx catalyst; an excess air ratio change device configured to change an excess air ratio of the exhaust gas; a reducing agent supply device configured to supply a reducing agent for SCR including a material for $NH_3$ or $NH_3$ between the NOx catalyst and the SCR catalyst in the exhaust passages; and a control device configured to control the excess air ratio change device and the reducing agent supply device, the control device being configured to execute regeneration control to regenerate the NOx catalyst by setting the excess air ratio of the exhaust gas at 1 or less by the excess air ratio change device, wherein during the regeneration control, the control device estimates an stored oxygen decreasing speed that is a speed at which oxygen stored in the NOx catalyst decreases, and the control device controls the reducing agent supply device in such a manner that a quantity of the reducing agent for SCR to be supplied from the reducing agent supply device to the exhaust passage becomes small when the stored oxygen decreasing speed is high, as compared to when the stored oxygen decreasing speed is low.

The engine with an exhaust emission control device according to the present invention can inhibit $NH_3$ from slipping downstream from the SCR catalyst while purifying NOx appropriately.

DESCRIPTION OF EMBODIMENT

An engine with an exhaust emission control device according to an embodiment of the present invention will be described below with reference to the drawings.

(1) Overall Configuration

Figure 1:
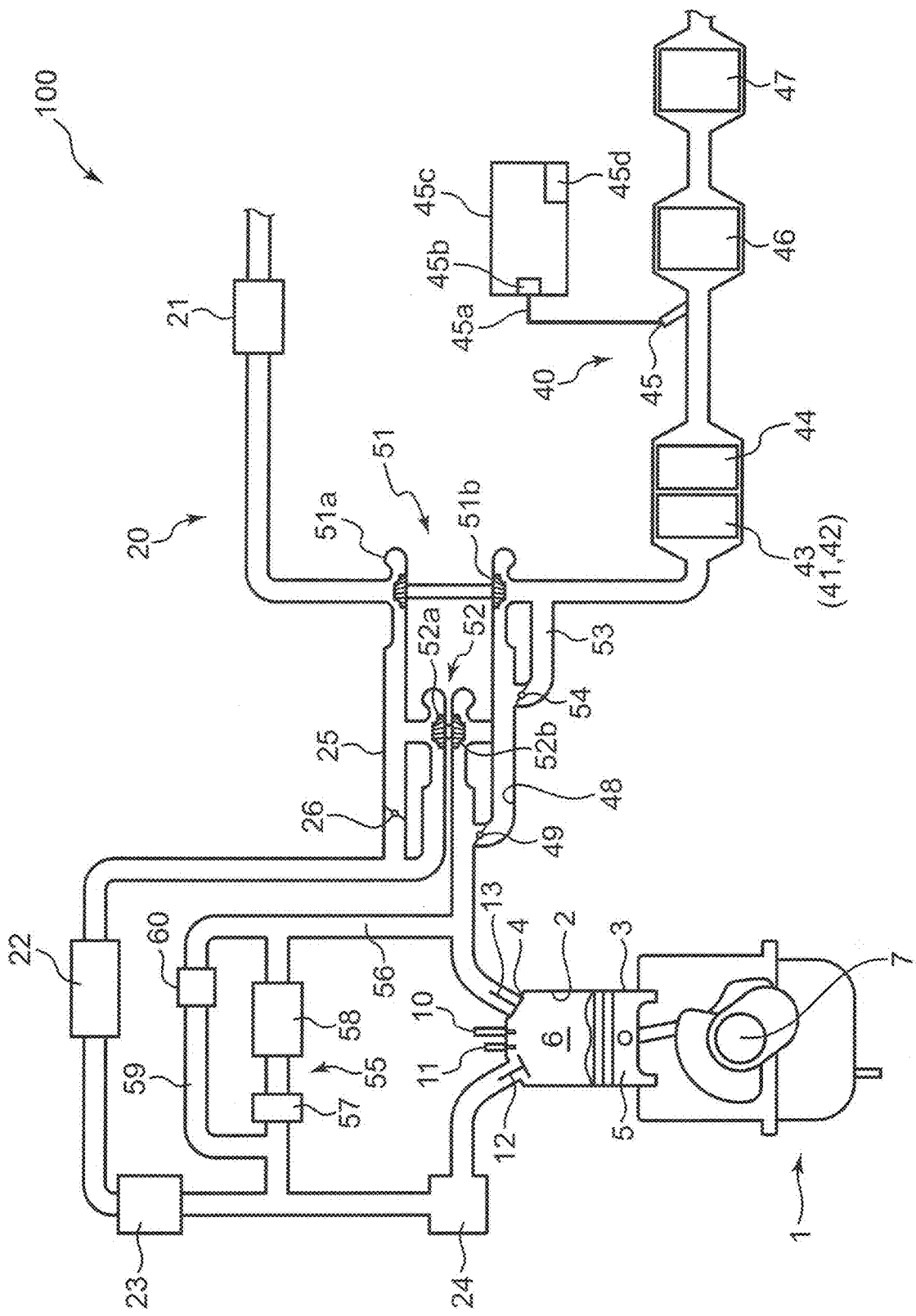
FIG. 1 is a schematic configuration diagram of an engine system to which an engine with an exhaust emission control device according to an embodiment of the present invention is applied.

FIG. 1 is a schematic configuration diagram of an engine system 100 to which the engine with an exhaust emission control device of the present embodiment is applied.

The engine system 100 includes a 4-stroke engine body 1, an intake passage 20 for introducing air (intake air) into the engine body 1, and an exhaust passage 40 for discharging an exhaust gas from the engine body 1 to the outside, a first turbocharger 51, and a second turbocharger 52. The engine system 100 is provided in a vehicle. The engine body 1 is used as a driving source for the vehicle. The engine body 1 is, for example, a diesel engine. The engine body 1 includes four cylinders 2 arranged in a line in a direction orthogonal to a surface of paper of FIG. 1.

The engine body 1 includes a cylinder block 3 in which the cylinders 2 are formed, a cylinder head 4 provided on an upper surface of the cylinder block 3, and pistons 5 inserted into the cylinders 2 in a reciprocatingly slidable manner. Combustion chambers 6 are formed above the pistons 5.

The pistons 5 are coupled to a crankshaft 7, and the crankshaft 7 rotates around a central axis of the crankshaft 7 according to reciprocating motion of the pistons 5.

In the cylinder head 4, one set of an injector (excess air ratio change device) 10 that injects a fuel into the combustion chamber 6 (into the cylinder 2) and a glow plug 11 for raising a temperature of an air-fuel mixture within the combustion chamber 6 is provided for each cylinder 2. In an example shown in FIG. 1, the injector 10 is provided at the center of a ceiling surface of the combustion chamber 6 to overlook the combustion chamber 6 from above. The glow plug 11 has, at the tip, a heat-generating part that generates heat by applying electric power. The glow plug 11 is attached to the ceiling surface of the combustion chamber 6 such that this heat-generating part is positioned near the tip of the injector 10. For example, the injector 10 includes a plurality of nozzle holes at the tip. The glow plug 11 is disposed such that the heat-generating part is positioned between a plurality of sprays from the plurality of nozzle holes of the injector 10 to avoid direct contact with the fuel sprays.

The injector 10 can execute a main injection that is to be executed for obtaining engine torque and that injects a fuel that burns near the compression top dead center into the combustion chamber 6. Also, the injector 10 can execute a post injection for injecting a fuel into the combustion chamber 6 at a time retarded from the main injection when combustion energy hardly contributes to engine torque even if the injected fuel burns.

The cylinder head 4 is provided with an intake port for introducing air supplied from the intake passage 20 into the combustion chamber 6 of each cylinder 2, an intake valve 12 that opens and closes the intake port, an exhaust port for deriving the exhaust gas generated in the combustion chamber 6 of each cylinder 2 to the exhaust passage 40, and an exhaust valve 13 that opens and closes the exhaust port.

The intake passage 20 is provided with, in order from the upstream side, an air cleaner 21, a compressor 51a of the first turbocharger 51, a compressor 52a of the second turbocharger 52, an intercooler 22, a throttle valve 23, and a surge tank 24. An intake side bypass passage 25 that bypasses the second compressor 52a, and an intake side bypass valve 26 that opens and closes the intake side bypass passage 25 are provided in the intake passage 20. The intake side bypass valve 26 is switched between a fully closed state and a fully open state by a driving device (not shown).

The exhaust passage 40 is provided with, in order from the upstream side, a turbine 52b of the second turbocharger 52, a turbine 51b of the first turbocharger 51, a first catalyst 43, a diesel particulate filter (DPF) 44 that collects particulate matters (PM) in the exhaust gas, a urea injector (reducing agent supply device) 45, a selective catalytic reduction (SCR) catalyst 46, and a slip catalyst 47.

The first catalyst 43 includes an NOx catalyst 41 that purifies NOx, and a diesel oxidation catalyst (DOC) 42. Using oxygen in the exhaust gas, the DOC 42 oxidizes and changes hydrocarbon (HC), carbon monoxide (CO), and the like to water and carbon dioxide.

The NOx catalyst 41 is an NOx storage and reduction type catalyst (NSC: NOx storage catalyst). The NOx catalyst 41 stores NOx in the exhaust gas in a lean state where an excess air ratio λ of the exhaust gas is larger than 1 (state where an exhaust gas air-fuel ratio is larger than a theoretical air-fuel ratio). Meanwhile, the NOx catalyst 41 reduces the stored NOx in a rich state where the excess air ratio λ of the exhaust gas is near 1 or smaller than 1 (state where the air-fuel ratio of the exhaust gas is near or smaller than theoretical air-fuel ratio). That is, the NOx catalyst 41 reduces the stored NOx in a reducing atmosphere in which the exhaust gas passing through the NOx catalyst 41 contains a lot of unburned HC.

In detail, the NOx catalyst 41 is configured to store oxygen contained in the exhaust gas in a lean state where the excess air ratio λ of the exhaust gas is larger than 1. For example, the NOx catalyst 41 contains ceria and the like having oxygen storage capability. The NOx catalyst 41 oxidizes NO in the exhaust gas (into $NO_2$) by using oxygen contained in the exhaust gas and stored oxygen, and stores this oxide.

When reducing stored NOx, the NOx catalyst 41 generates and releases $NH_3$ (ammonia). Specifically, during NOx reduction, $NH_3$ is generated through coupling of "N" in NOx stored in the NOx catalyst 41 and H or the like that is a reducing agent introduced into the NOx catalyst 41, and NOx that passes through the NOx catalyst 41 and H or the like that is a reducing agent introduced into the NOx catalyst 41.

The first catalyst 43 is formed, for example, by a catalyst material of NSC being coated on a surface of a catalyst material layer of DOC.

Note that in the present embodiment, a device that supplies air or fuel to the exhaust passage 40 is not provided. Therefore, the excess air ratio λ of the exhaust gas and the excess air ratio λ of the air-fuel mixture within the combustion chamber 6 correspond to each other. That is, when the excess air ratio λ of the air-fuel mixture within the combustion chamber 6 is larger than 1, the excess air ratio λ of the exhaust gas is also larger than 1, whereas when the excess air ratio λ of the air-fuel mixture within the combustion chamber 6 is equal to or less than 1, the excess air ratio λ of the exhaust gas is also equal to or less than 1.

A urea injector 45 injects urea into the exhaust passage 40 downstream from the DPF 44. The urea injector 45 is connected to a urea tank 45c via a urea supply path 45a and a urea transmission pump 45b. The urea injector 45 injects urea pressure-fed from the urea tank 45c by the urea transmission pump 45b into the exhaust passage 40. In the present embodiment, a heater 45d for preventing freeze of urea is provided. The urea injected from the urea injector 45 is introduced into an SCR catalyst 46.

The SCR catalyst 46 causes $NH_3$ (ammonia) to react with (reduce) NOx in the exhaust gas to purify NOx. The SCR catalyst 46 hydrolyzes the urea injected from the urea injector 45 to generate $NH_3$ ($CO(NH_2)_2 + H_2O \rightarrow CO_2 + 2NH_3$), and causes the generated $NH_2$ to react with (reduce) NOx in the exhaust gas to purify NOx.

In this way, in the present embodiment, the urea injected (supplied) by the urea injector 45 into the exhaust passage 40 functions as a material for $NH_3$ and a reducing agent for SCR in the claims.

In detail, the introduced $NH_3$ is adsorbed in the SCR catalyst 46, and this adsorbed $NH_3$ reacts with NOx, whereby NOx is reduced. As described above, during reduction of NOx in the NOx catalyst 41, $NH_3$ is released also from the NOx catalyst 41. The SCR catalyst 46 purifies NOx also by causing the $NH_3$ released from the NOx catalyst 41 to react with (reduce) NOx in the exhaust gas.

The SCR catalyst 46 is produced, for example, by causing zeolite having a function to trap $NH_3$ to support catalyst metal (Fe, Ti, Ce, W, and the like) having a function to reduce NOx with $NH_3$ to make a catalyst component, and causing a cell wall of a honeycomb carrier to support this catalyst component.

Both the SCR catalyst 46 and the NOx catalyst 41 can purify NOx. However, the SCR catalyst 46 differs from the NOx catalyst 41 in temperature at which a purification rate increases. The NOx purification rate of the SCR catalyst 46 is high when the temperature of the exhaust gas is relatively high, whereas the NOx purification rate of the NOx catalyst 41 is high when the temperature of the exhaust gas is relatively low.

In the present embodiment, NOx is purified using both the NOx catalyst 41 and the SCR catalyst 46. Specifically, when the temperature of the SCR catalyst 46 is less than a first temperature and the NOx purification rate by the SCR catalyst 46 is low, NOx is purified by only the NOx catalyst 41. When the temperature of the SCR catalyst 46 is equal to or higher than a second temperature (second temperature is higher than first temperature) and the NOx purification rate by the SCR catalyst 46 is high, NOx is purified by only the SCR catalyst 46. When the temperature of the SCR catalyst 46 is between the first temperature and the second temperature, NOx is purified by both the NOx catalyst 41 and the SCR catalyst 46. When a flow rate of the exhaust gas is large and the NOx purification rate by the SCR catalyst 46 is low, NOx is purified by both the NOx catalyst 41 and the SCR catalyst 46.

The slip catalyst 47 oxidizes and purifies unreacted $NH_3$ discharged from the SCR catalyst 46.

The exhaust passage 40 is provided with an exhaust side bypass passage 48 that bypasses the second turbine 52b, an exhaust side bypass valve 49 that opens and closes the exhaust side bypass passage 48, a wastegate passages 53 that bypasses a first turbine 51b, and a wastegate valve 54 that opens and closes the wastegate passages 53. Each of the exhaust side bypass valve 49 and the wastegate valve 54 is switched between a fully closed state and a fully open state by a driving device (not shown), and is changed to an arbitrary opening between the two states. Openings of the exhaust side bypass valve 49, the wastegate valve 54, and the intake side bypass valve 25 are changed based on an engine rotation speed and an engine load.

The engine system 100 further includes an exhaust gas recirculation (EGR) device 55 that recirculates part of the exhaust gas to intake air. The EGR device 55 includes an EGR passage 56 that connects a portion on an upstream side of an upstream end of the exhaust side bypass passage 48 in the exhaust passage 40 and a portion between the throttle valve 23 and the surge tank 24 in the intake passage 20, a first EGR valve 57 that opens and closes the EGR passage 56, and an EGR cooler 58 that cools the exhaust gas passing through the EGR passage 56. In addition, the EGR device 55 includes an EGR cooler bypass passage 59 that bypasses the EGR cooler 58, and a second EGR valve 60 that opens and closes the EGR cooler bypass passage 59.

(2) Control System

Figure 2:
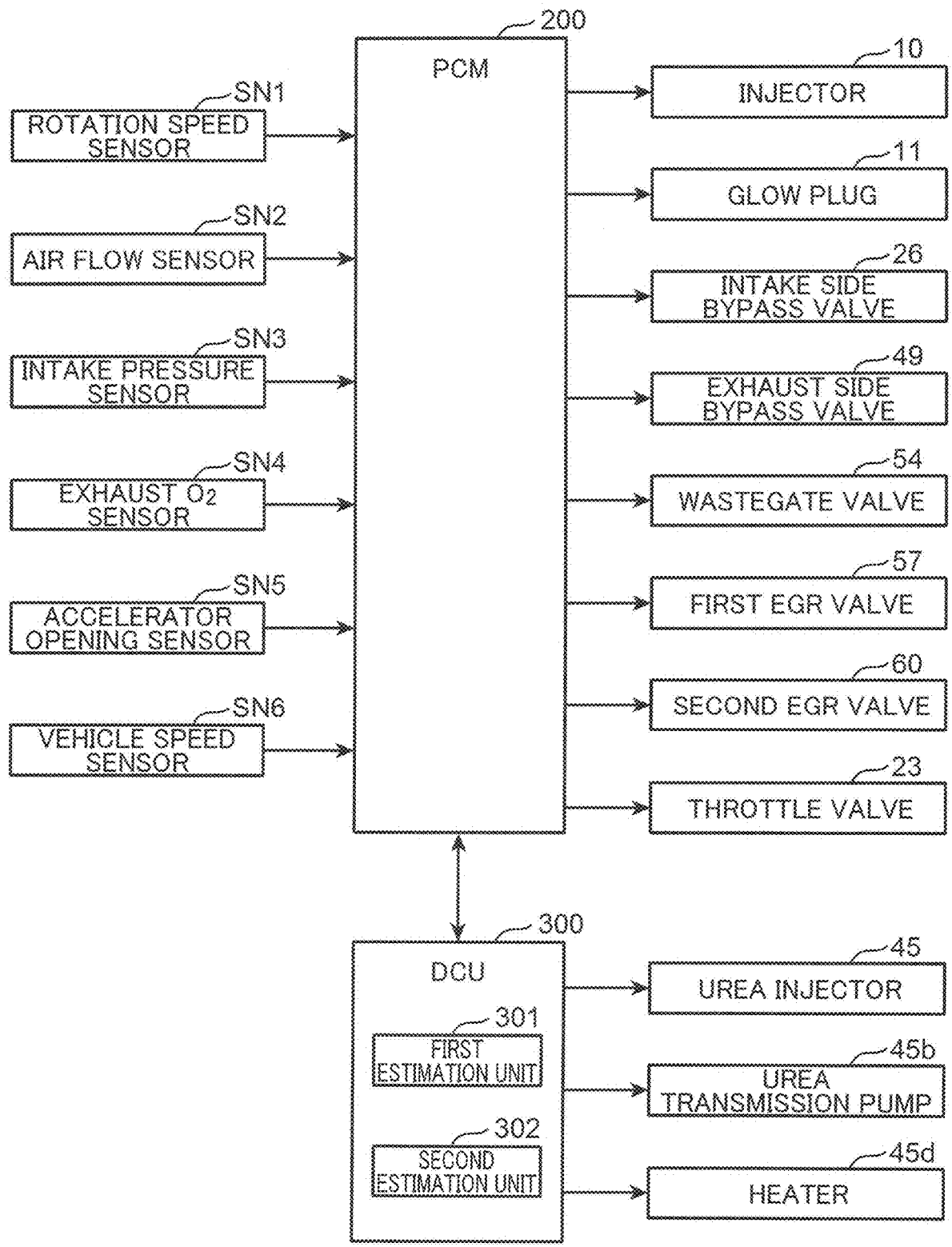
FIG. 2 is a block diagram showing a control system of the engine system.

A control system of the engine system will be described with reference to FIG. 2. A vehicle is provided with a dosing control unit (DCU) 300 for mainly controlling the urea injector 45, and a power-train control module (PCM) 200 for controlling other units. Each of the PCM 200 and the DCU 300 is a microprocessor including a CPU, a ROM, a RAM, an I/F, and other components. In the present embodiment, the PCM 200 and the DCU 300 correspond to a control device in the claims.

Information from various sensors is input into the PCM 200. For example, the PCM 200 is electrically connected to a rotation speed sensor SN1 that detects a rotation speed of the crankshaft 7, that is, engine rotation speed, and an air flow sensor SN2 that is provided near the air cleaner 21 and detects an intake air quantity that is a quantity of fresh air (air) circulating the intake passage 20. The PCM 200 is electrically connected to an intake pressure sensor SN3 that is provided in the surge tank 24 and detects pressure of intake air within the surge tank 24 after being supercharged by the turbochargers 51 and 52, that is, supercharged pressure, an exhaust $O_2$ sensor SN4 that detects oxygen concentration in a portion between the first turbocharger 51 and the first catalyst 43 in the exhaust passage 40, and other sensors. The PCM 200 receives input signals from these sensors SN1 to SN4. The vehicle is provided with an accelerator opening sensor SN5 that detects an accelerator opening that is an opening of an accelerator pedal (not shown) operated by a driver, a vehicle speed sensor SN6 that detects a vehicle speed, and other sensors. Detection signals by these sensors SN5 and SN6 are also input into the PCM 200. The PCM 200 executes various calculations and the like based on the input signals from the sensors (SN1 to SN6 and the like), and controls the injector 10 and the like.

The DCU 300 and the PCM 200 are bi-directionally communicatively connected. The DCU 300 calculates a quantity of urea to be injected into the exhaust passage 40 by the urea injector 45 by using a calculation result and the like by the PCM 200, and controls the urea injector 45. The DCU 300 also controls the urea transmission pump 45$b$ and the heater 45$d$.

(2-1) DeNOx Control

The following describes DeNOx control (regeneration control) for reducing NOx stored in the NOx catalyst 41 (hereinafter referred to as stored NOx as appropriate) and releasing (separating) the stored NOx from the NOx catalyst 41, thereby regenerating the NOx catalyst 41.

In the present embodiment, in a normal operation in which DeNOx control, control for reducing SOx stored in the NOx catalyst 41 (so-called DeSOx control), or control for regenerating the DPF 44 (control for burning and eliminating particulate matters from the DPF 44) is not executed, not only the excess air ratio $\lambda$ of the air-fuel mixture within the combustion chamber 6 but also the excess air ratio $\lambda$ of the exhaust gas are set as $\lambda>1$ (for example, $\lambda$ is about 1.7) in order to increase fuel consumption performance. Hereinafter, the excess air ratio$\lambda$ of the air-fuel mixture within the combustion chamber 6 is simply referred to as excess air ratio $\lambda$ of the air-fuel mixture as appropriate.

Meanwhile, when the excess air ratio $\lambda$ of the exhaust gas is rich (near 1 or less than 1) as described above, the stored NOx is reduced and NOx is released from the NOx catalyst 41. Therefore, in order to reduce the stored NOx, it is necessary to make the excess air ratio $\lambda$ of the exhaust gas and the excess air ratio $\lambda$ of the air-fuel mixture lower than in the normal operation.

As one method for decreasing the excess air ratio $\lambda$ of the air-fuel mixture (excess air ratio $\lambda$ of the exhaust gas), it can be considered to decrease a quantity of fresh air (air) to be introduced into the combustion chamber 6. However, when the quantity of fresh air is simply decreased, engine torque could not be obtained appropriately. Particularly, when the quantity of fresh air is decreased during acceleration, acceleration performance could deteriorate. Also, it is relatively difficult to control the excess air ratio $\lambda$ of the air-fuel mixture accurately by adjusting the quantity of fresh air.

Therefore, the present embodiment executes the post injection as DeNOx control, thereby decreasing the excess air ratio of the air-fuel mixture while controlling the decreasing quantity of the quantity of fresh air at a low level. That is, the PCM 200 executes control to cause the injector 10 to execute the post injection in addition to the main injection as DeNOx control. Note that the post injection is stopped in the normal operation.

Figure 3:
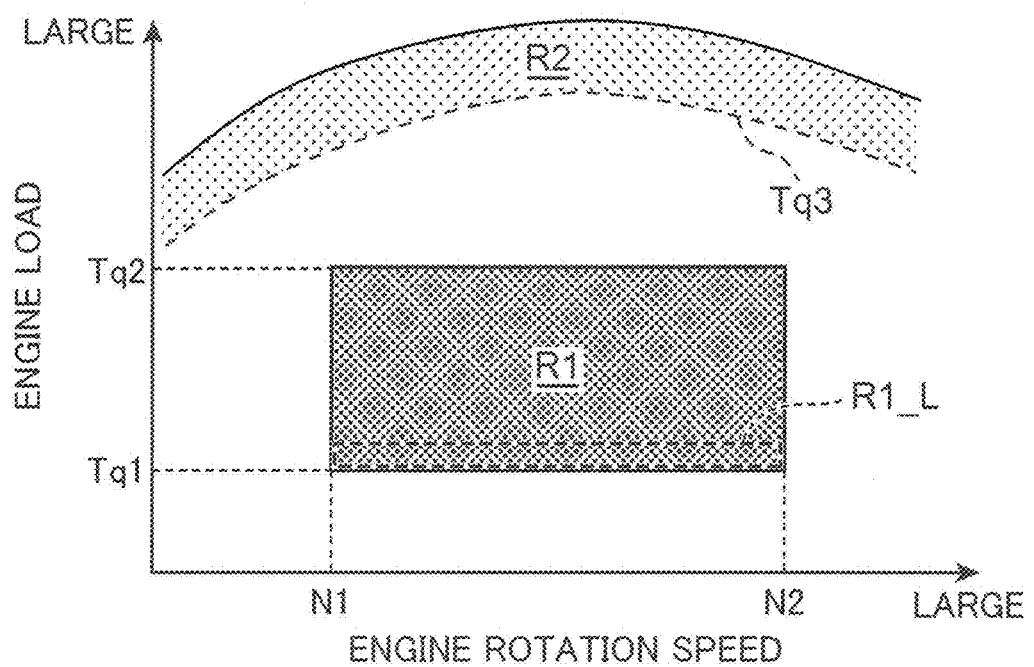
FIG. 3 is a diagram showing control areas of passive DeNOx control and active DeNOx control.

In this way, the present embodiment executes DeNOx control for executing the post injection in order to reduce the stored NOx only in a first area R1 and a second area R2 shown in FIG. 3. The first area R1 is an area in which the engine rotation speed is equal to or greater than a preset first reference rotation speed N1 and equal to or less than a preset second reference rotation speed N2, and the engine load is equal to or greater than a preset first reference load Tq1 and equal to or less than a preset second reference load Tq2. The second area R2 is an area in which the engine load is higher than in the first area R1 and the engine load is equal to or greater than a preset third reference load Tq3.

In the first area R1, the PCM 200 executes active DeNOx control for executing the post injection at timing when the post-injected fuel burns within the combustion chamber 6 (in the first half of expansion stroke, in detail, in a period between the compression top dead center and 90° CA after the compression top dead center, for example, 30 to 70° CA after the compression top dead center). Note that when active DeNOx control is executed, in order to promote combustion of the post-injected fuel, the glow plug 11 receives electric power and heats the air-fuel mixture.

Meanwhile, in the second area R2, the PCM 200 executes passive DeNOx control for executing the post injection at timing when the post-injected fuel does not burn within the combustion chamber 6 (in the second half of expansion stroke, for example, 110° CA after the compression top dead center).

This is due to the following reason.

In an area where the engine load is low or the engine rotation speed is low, the temperature of the exhaust gas is low, and thus the temperature of the NOx catalyst 41 is likely to be lower than the temperature at which the stored NOx can be reduced. Therefore, in the present embodiment, DeNOx control is stopped in this area.

When the post-injected fuel is discharged as it is to the exhaust passage 40 without burning, the EGR cooler 58 and the like could be blocked by deposit resulting from the unburned fuel. Therefore, it is preferable to burn the post-injected fuel within the combustion chamber 6. In an area where the engine load is high or the engine rotation speed is high, the temperature within the combustion chamber 6 is high, or time per 1 crank angle is short, and thus it is difficult to sufficiently mix the post-injected fuel and air by the time gas within the combustion chamber 6 is discharged. Therefore, in this area, the post-injected fuel could not be sufficiently burned within the combustion chamber 6. In addition, soot could increase if mixture of fuel and air is insufficient. Therefore, in such an area, DeNOx control is basically stopped.

However, since the injection quantity of the main injection (hereinafter referred to as main injection quantity as appropriate) is large in the second area R2 where the engine load is very high, the excess air ratio of the air-fuel mixture is controlled at a small level even in the normal operation. Therefore, in the second area R2, it is possible to decrease the injection quantity of the post injection necessary for reducing the stored NOx (hereinafter referred to as post injection quantity as appropriate), and to control the influence caused by the unburned fuel being discharged to the exhaust passage 40 at a small level.

Therefore, in the first area R1 where both the engine load and the engine rotation speed are not too low and not too high, the present embodiment executes active DeNOx control for burning the post-injected fuel within the combustion chamber 6. In the second area R2, the present embodiment executes passive DeNOx control for not burning the post-injected fuel within the combustion chamber 6. Note that the second area R2 is an area where the temperature of the exhaust gas is sufficiently high and the DOC catalyst 42 is sufficiently activated. Therefore, the unburned fuel discharged to the exhaust passage 40 is purified by this DOC catalyst 42.

(2-2) Fuel Injection Control

Figure 4:
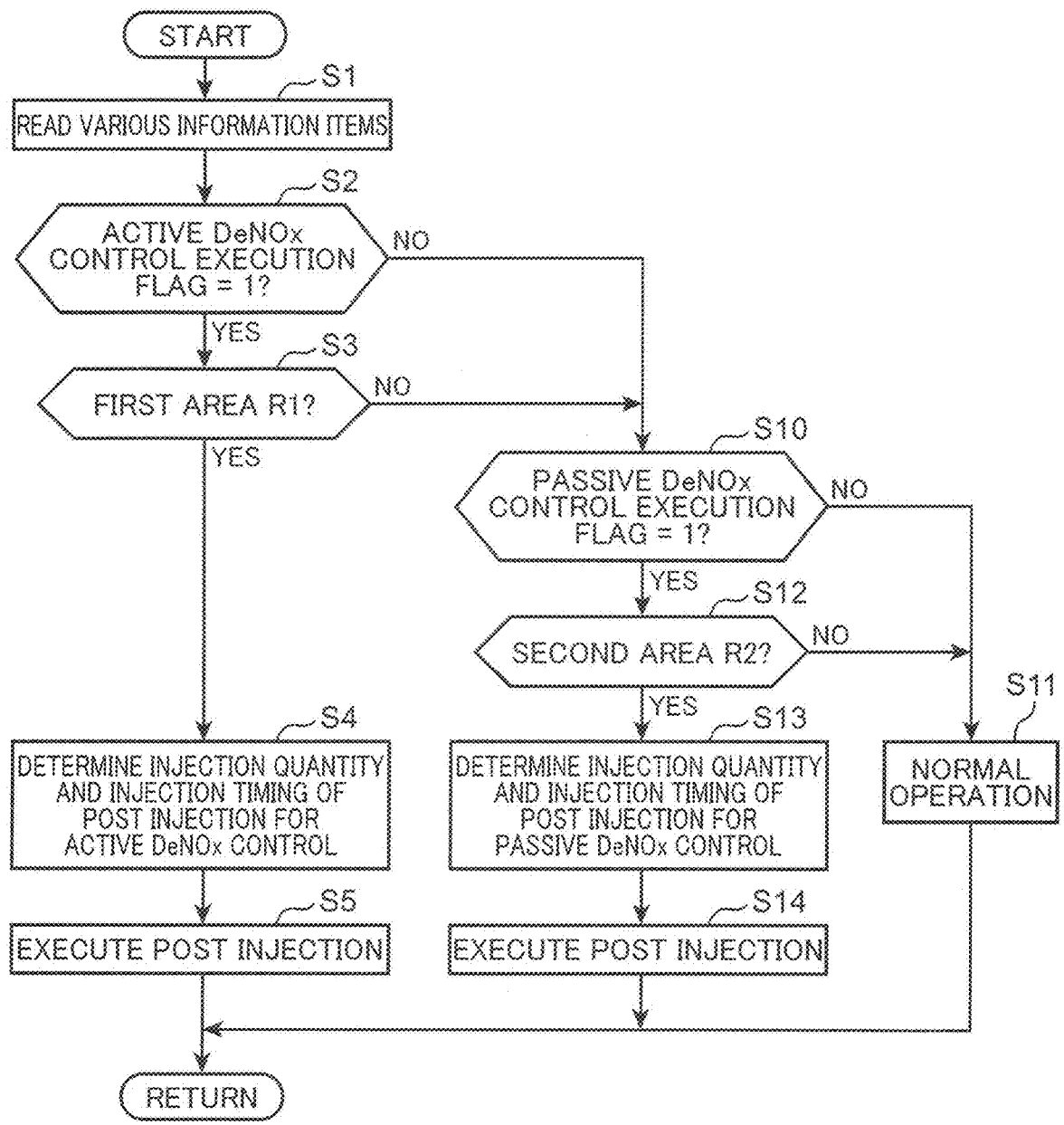
FIG. 4 is a flowchart showing a procedure for controlling fuel injection.

A procedure for controlling fuel injection will be described with reference to a flowchart of FIG. 4.

First, in step S1, the PCM 200 acquires various information items on a vehicle including values of the accelerator opening, the engine rotation speed, an active DeNOx control execution flag, and a passive DeNOx control execution flag.

The active DeNOx control execution flag is a flag that becomes "1" when basic conditions for executing active DeNOx control are satisfied, and otherwise the flag becomes "0". In the present embodiment, the active DeNOx control execution flag becomes "1" when the NOx storage quantity that is a quantity of NOx stored in the NOx catalyst 41 is equal to or greater than a preset first reference quantity, the temperature of the SCR catalyst 46 is less than an SCR determination temperature that is set near the second temperature, and the temperature of the NOx catalyst 41 is equal to or higher than a preset NOx reducible temperature. When active DeNOx control is executed for the first time after engine start, the first reference quantity is near the maximum quantity of the NOx quantity that can be stored in the NOx catalyst 41, and otherwise, the first reference quantity is somewhat lower than this maximum amount. The NOx reducible temperature is the minimum value of the temperature at which the NOx catalyst 41 can reduce NOx, and the NOx reducible temperature is a preset temperature.

The passive DeNOx control execution flag is a flag that becomes "1" when basic conditions for executing passive DeNOx control are satisfied, and otherwise the flag becomes "0". In the present embodiment, the passive DeNOx control execution flag becomes "1" when the NOx storage quantity is equal to or greater than a preset third reference quantity, the temperature of the SCR catalyst 46 is less than the SCR determination temperature, and the temperature of the NOx catalyst 41 is equal to or higher than the preset NOx reducible temperature. The third reference quantity is set at a value smaller than a first storage quantity determination value. For example, the third storage quantity determination value is set at a value that is about half of the maximum value of the quantity of NOx that can be stored in the NOx catalyst 41.

In this way, the active DeNOx control execution flag and the passive DeNOx control execution flag become 1 when the purification rate of NOx by the SCR catalyst 46 is relatively low, a large quantity of NOx has been stored in the NOx catalyst 41 although the NOx catalyst 41 needs to purify NOx, and the NOx catalyst 41 can reduce NOx.

Note that the temperature of the NOx catalyst 41 is estimated, for example, based on the temperature detected by a temperature sensor provided immediately upstream from the NOx catalyst 41. The temperature of the SCR catalyst 46 is estimated, for example, based on the temperature detected by a temperature sensor provided immediately upstream from the SCR catalyst 46. The NOx storage quantity is estimated, for example, by integrating the NOx quantity in the exhaust gas estimated based on information such as an operational status of the engine body 1 and the flow rate and temperature of the exhaust gas.

After step S1, the process proceeds to step S2. In step S2, the PCM 200 determines whether the active DeNOx control execution flag is "1". If the determination in step S2 is NO, the process proceeds to step S10. If the determination in step S2 is YES, the process proceeds to step S3.

In step S3, the PCM 200 determines whether the engine is being operated in the first area R1. If the determination in step S3 is NO, the process proceeds to step S10.

If the determination in step S3 is YES, the process proceeds to step S4. In step S4, the PCM 200 determines the injection quantity and injection timing of the post injection for active DeNOx control.

Specifically, the PCM 200 calculates the fuel injection quantity corresponding to request torque calculated from information such as the accelerator opening as the main injection quantity. Next, the PCM 200 calculates a target value for the total injection quantity obtained by adding the main injection quantity to the post injection quantity based on the air quantity to be introduced into the cylinder 2, and the target value for the excess air ratio $\lambda$ for active DeNOx control of the air-fuel mixture and the exhaust gas. Then, the PCM 200 determines the post injection quantity based on the calculated target value for the total injection quantity and the calculated main injection quantity. Note that the air quantity to be introduced into the cylinder 2 is estimated using a value detected by the air flow sensor SN2 and other information. In this way, the present embodiment changes the excess air ratio $\lambda$ of the exhaust gas by changing the injection quantity of the post injection.

The PCM 200 sets the injection timing of the post injection for active DeNOx control as timing in the first half of expansion stroke as described above. The injection timing of the post injection is hereinafter referred to as post injection timing as appropriate. When the post injection timing is excessively advanced, combustion starts in a state where air and fuel are not sufficiently mixed, resulting in an increase in the quantity of smoke generation Therefore, the present embodiment adjusts the post injection timing in a range of the first half of the expansion stroke in order to prevent the quantity of smoke generation from exceeding a predetermined quantity based on the air quantity to be introduced into the cylinder 2. Note that during active DeNOx control, a proper quantity of EGR gas is introduced into the cylinder 2 to delay ignition of the post-injected fuel and inhibit smoke generation.

After step S4, the process proceeds to step S5. In step S5, the PCM 200 causes the injector 10 to inject the fuel of the above-described main injection quantity at predetermined timing of the main injection. Also, the PCM 200 causes the injector 10 to inject the fuel of the post injection quantity for active DeNOx control determined in step S4 at post injection timing determined in step S4. After step S5, the PCM 200 ends the process (returns to step S1). Note that when the post injection quantity is small, the air quantity to be introduced into the cylinder 2 may be decreased by controlling the throttle valve 23 on a closed side.

In step S10, the PCM 200 determines whether the passive DeNOx control execution flag is "1". If the determination in step S10 is NO, the process proceeds to step S11.

In step S11, the PCM 200 executes normal control without executing active DeNOx control and passive DeNOx control. That is, the PCM 200 stops the post injection and causes the fuel of the quantity corresponding to request torque calculated from the accelerator opening or the like to be injected at the predetermined main injection timing. After step S11, the PCM 200 ends the process (returns to step S1).

If the determination in step S10 is YES, the process proceeds to step S12.

In step S12, the PCM 200 determines whether the engine is being operated in the second area R2. If the determination in step S12 is NO, the process proceeds to step S11.

If the determination in step S12 is YES, the process proceeds to step S13. In step S13, the PCM 200 determines the injection quantity and injection timing of the post injection for passive DeNOx control.

Specifically, the PCM 200 calculates the fuel injection quantity corresponding to request torque calculated from information such as the accelerator opening as the main injection quantity. Next, the PCM 200 calculates a target value for the total injection quantity obtained by adding the main injection quantity to the post injection quantity based on the air quantity to be introduced into the cylinder 2, and the target value for the excess air ratio λ for passive DeNOx control of the air-fuel mixture and the exhaust gas. Then, the PCM 200 determines the post injection quantity based on the calculated target value for the total injection quantity and the calculated main injection quantity. In the present embodiment, the PCM 200 sets the injection timing of the post injection for passive DeNOx control as timing in the first half of expansion stroke as described above.

After step S13, the process proceeds to step S14. In step S14, the PCM 200 causes the injector 10 to inject the fuel of the above-described main injection quantity at predetermined timing of the main injection. Also, the PCM 200 causes the injector 10 to inject the fuel of the post injection quantity for passive DeNOx control determined in step S13 at post injection timing determined in step S12. After step S14, the PCM 200 ends the process (returns to step S1).

(3) Injection Control of Urea Water

Next, injection control of the urea injector 45 will be described. Hereinafter, the quantity of urea injected from the urea injector 45 is referred to as a urea injection quantity as appropriate. As described above, the DCU 300 executes the injection control of the urea injector 45 while obtaining information from the PCM 200.

(3-1) Outline of Urea Injection Control During DeNOx Control

As described above, during NOx reduction, that is, while DeNOx control is executed, $NH_3$ is released from the NOx catalyst 41 and introduced into the SCR catalyst 46. Therefore, if the urea injection quantity while DeNOx control is executed is set at the same quantity as the urea injection quantity while DeNOx control is not executed, the quantity of $NH_3$ to be supplied to the SCR catalyst 46 becomes excessive. As a result, $NH_3$ could slip downstream from the SCR catalyst 46. Therefore, while DeNOx control is executed, the urea injection quantity is set at a smaller quantity than while DeNOx control is not executed.

However, it has become apparent that there is a possibility that, by only simply controlling the urea injection quantity while DeNOx control is executed at a predetermined quantity smaller than while DeNOx control is not executed regardless of operating conditions, the quantity of $NH_3$ to be supplied to the SCR catalyst 46 becomes excessive or insufficient, and a large quantity of $NH_3$ slips downstream from the SCR catalyst 46, or the SCR catalyst 46 fails to purify NOx appropriately.

The present inventors have studied this problem earnestly and have determined that the NOx catalyst 41 releases $NH_3$ only after a predetermined period elapses from the time DeNOx control is started. Then, the present inventors have determined that the problem arises (problem that the quantity of $NH_3$ to be supplied to the SCR catalyst 46 becomes excessive or insufficient) because this predetermined period differs depending on operating conditions.

Hereinafter, the period from the start of DeNOx control to the start of $NH_3$ release from the NOx catalyst 41 is referred to as a delay period as appropriate.

That is, even if the period for executing DeNOx control is the same, $NH_3$ is supplied from the NOx catalyst 41 to the SCR catalyst 46 over a longer period of time as the delay period decreases. Therefore, when the total quantity of urea to be injected into the exhaust passage 40 while DeNOx control is executed is constant regardless of the delay period, the quantity of $NH_3$ supplied to the SCR catalyst 46 becomes excessive, and a lot of $NH_3$ slips downstream from the SCR catalyst 46. Alternatively, the quantity of $NH_3$ supplied to the SCR catalyst 46 is insufficient, and the purification rate of NOx in the SCR catalyst 46 deteriorates.

Also, the present inventors have determined that there is a correlation between the delay period and a decreasing quantity of oxygen stored in the NOx catalyst 41 per unit time (hereinafter referred to as stored oxygen decreasing speed). In more detail, the present inventors have determined that, as the stored oxygen decreasing speed increases, the delay period decreases.

It is considered that the delay period decreases as the stored oxygen decreasing speed increases for the following reason.

When the reducing agent is supplied to the NOx catalyst 41 following DeNOx control, "N" in NOx stored in the NOx catalyst 41 and NOx passing through the NOx catalyst 41 are combined with H that is the reducing agent introduced into the NOx catalyst 41 to generate $NH_3$ in the NOx catalyst 41. However, the NOx catalyst 41 has an oxygen storage capability. As the excess air ratio λ of the exhaust gas becomes larger than 1 in the normal operation or the like, a large quantity of oxygen is stored in the NOx catalyst 41. Therefore, immediately after DeNOx control is started and introduction of the reducing agent to the NOx catalyst 41 is started, the supplied reducing agent will react not with "N" but with oxygen stored in the NOx catalyst 41. This will inhibit $NH_3$ generation reaction in the NOx catalyst 41. Accordingly, it is considered that generation and release of $NH_3$ in the NOx catalyst 41 are started only when oxygen stored in the NOx catalyst 41 is decreased to zero. A period from the time when DeNOx control is started to the time when oxygen stored in the NOx catalyst 41 is decreased to zero decreases as the stored oxygen decreasing speed increases. Therefore, it is considered that as the stored oxygen decreasing speed increases, the NOx catalyst 41 starts to release $NH_3$ earlier, resulting in shorter delay period.

From the above-described knowledge, the present embodiment estimates the stored oxygen decreasing speed, and based on the estimation of the stored oxygen decreasing speed, the present embodiment estimates the delay period.

Specifically, the stored oxygen decreasing speed, that is, the decreasing quantity of oxygen stored in the NOx catalyst 41 per unit time is integrated. The time when the integrated value becomes equal to or greater than the stored oxygen maximum quantity, that is, the maximum quantity of oxygen that can be stored in the NOx catalyst 41 is estimated as the time when the release of $NH_3$ is started from the NOx catalyst 41 (hereinafter referred to as $NH_3$ release start time). Then, the period from the DeNOx control start time to this $NH_3$ release start time is estimated as the delay period. A procedure for estimating the stored oxygen decreasing speed will be described later.

Until this delay period elapses after DeNOx control starts, the urea injection quantity is maintained at the same quantity as before DeNOx control is executed, that is, while DeNOx control is not executed. The urea injection quantity is set smaller than while DeNOx control is not executed only after the delay period elapses (only after the $NH_3$ release start time).

Therefore, in the present embodiment, even if the period for executing DeNOx control is the same, the period in which the urea injection quantity is smaller than while DeNOx control is not executed increases as the delay period decreases. Accordingly, the total quantity of the urea injection quantity while DeNOx control is executed, that is, the total quantity of urea supplied to the exhaust passage 40 while DeNOx control is executed decreases as the delay period decreases.

Here, the delay period decreases as the stored oxygen decreasing speed increases. Therefore, in the present embodiment, the total quantity of the urea injection quantity while DeNOx control is executed decreases as the stored oxygen decreasing speed increases.

In the present embodiment, when the delay period elapses while DeNOx control is executed (when the $NH_3$ release start time comes), the quantity of $NH_3$ to be released from the NOx catalyst 41 (hereinafter referred to as $NH_3$ release quantity as appropriate) is estimated at each time. In addition, this estimated $NH_3$ release quantity is converted into urea (the minimum value of the quantity of urea necessary for generating $NH_3$ of the $NH_3$ release quantity is calculated). Then, a value obtained by converting the $NH_3$ release quantity into urea is subtracted from the urea injection quantity while DeNOx control is not executed, and the resulting value is calculated as the urea injection quantity.

In the procedure for calculating the urea injection quantity, the urea injection quantity varies with the $NH_3$ release quantity. However, an influence of the oxygen decreasing speed on the total quantity of $NH_3$ released from the NOx catalyst 41 while DeNOx control is executed is larger than an influence of the $NH_3$ release quantity. As described above, in the present embodiment, the total quantity of the urea injection quantity while DeNOx control is executed decreases as the stored oxygen decreasing speed increases.

As will be described later, the $NH_3$ release quantity is calculated as a larger value when the exhaust gas is richer, and the stored oxygen decreasing speed is calculated as a larger value when the excess air ratio $\lambda$ of the exhaust gas is smaller, that is, when the exhaust gas is richer. Therefore, with respect to a variation in the excess air ratio $\lambda$ of the exhaust gas, both of the influence of the $NH_3$ release quantity on the total quantity of the urea injection quantity and the influence of the stored oxygen decreasing speed on the total quantity of the urea injection quantity are on the same side (on the side where the total quantity increases or decreases). That is, when the excess air ratio $\lambda$ of the exhaust gas is small, the total quantity of the urea injection quantity is decreased by an increase in the stored oxygen decreasing speed, and the total quantity of the urea injection quantity is decreased also by an increase in the $NH_3$ release quantity.

In addition, the $NH_3$ release quantity is calculated as a larger value as the flow rate of the exhaust gas (hereinafter referred to as exhaust flow rate as appropriate) increases. The stored oxygen decreasing speed is calculated as a larger value as the exhaust flow rate increases. Therefore, with respect to a variation in the exhaust flow rate, both of the influence of the $NH_3$ release quantity on the total quantity of the urea injection quantity and the influence of the stored oxygen decreasing speed on the total quantity of the urea injection quantity are on the same side (on the side where the total quantity increases or decreases).

(3-2) Outline of Urea Injection Control After DeNOx Control is Finished

As described above, during DeNOx control, $NH_3$ is introduced from the NOx catalyst 41 into the SCR catalyst 46. Therefore, the SCR catalyst 46 will adsorb a large quantity of $NH_3$ immediately after DeNOx control is finished. Therefore, if the urea injection quantity is increased significantly immediately after DeNOx control is finished, $NH_3$ to be supplied to the SCR catalyst 46 could become excessive, and $NH_3$ could slip downstream from the SCR catalyst 46.

Therefore, in the present embodiment, during a predetermined period after DeNOx control is finished (hereinafter referred to as switching period as appropriate), even while DeNOx control is not executed, the urea injection quantity is set smaller than in other periods while DeNOx control is not executed. However, after DeNOx control is finished, the $NH_3$ release quantity that is the release quantity of $NH_3$ from the NOx catalyst 41 becomes almost 0. Therefore, the urea injection quantity during the switching period is set larger than the urea injection quantity during DeNOx control. Note that the switching period has been set in advance.

In the present embodiment, the total quantity of $NH_3$ discharged from the NOx catalyst 41 following the execution of DeNOx control is estimated. Then, as this total quantity increases, the urea injection quantity during the switching period is decreased.

Specifically, the $NH_3$ release quantity at each time while DeNOx control is executed and after the delay period elapses is estimated, and this $NH_3$ release quantity is integrated until DeNOx control is finished. This integrated value is calculated as the above-described total quantity (total quantity of $NH_3$ discharged from the NOx catalyst 41 following the execution of DeNOx control). Then, based on this total quantity, the urea injection quantity in the switching period is determined.

(3-3) Procedure for Calculating Stored Oxygen Decreasing Speed

Next, the procedure for calculating the stored oxygen decreasing speed will be described.

The present inventors have determined that the stored oxygen decreasing speed $MreO_2$ can be estimated accurately by calculating $MreO_2$ by equation (2). In the present embodiment, the stored oxygen decreasing speed is calculated by using equation (2).

$$MreO_2 = (1-\lambda) \times K \times Mex \qquad (2)$$

In equation (2), $\lambda$ is the excess air ratio of the exhaust gas. In the present embodiment, as described above, the target value for the excess air ratio $\lambda$ of the exhaust gas during DeNOx control has been set in advance, and the post injection is executed so as to achieve this target value. Therefore, the excess air ratio $\lambda$ in equation (2) mostly becomes this target value, but in the present embodiment, the current excess air ratio $\lambda$ of the exhaust gas is calculated from information such as the fuel injection quantity and the air quantity to be introduced into the cylinder 2, and then this calculated value is used for equation (2).

In equation (2), Mex is the exhaust flow rate. In the present embodiment, the exhaust flow rate Mex is calculated by using information such as a value detected with an air flow sensor SN2.

In equation (2), K is a correction coefficient. This correction coefficient K is calculated by $K = \alpha1 \times \alpha2 \times \alpha3$, where $\alpha1$ is a first correction coefficient, $\alpha2$ is a second correction coefficient, and $\alpha3$ is a third correction coefficient.

The value calculated by the term of $(1-\lambda) \times Mex$ included in equation (2) is an oxygen quantity that is additionally required for the exhaust gas to oxidize all of not only the unburned fuel but also the reducing agent flowing into the NOx catalyst 41. Therefore, it is considered that X1 obtained by equation (3) below becomes a value close to the stored oxygen decreasing speed. That is, it is considered that stored oxygen of the quantity calculated by the term of $(1-\lambda) \times Mex$ is consumed in the NOx catalyst 41 when DeNOx control is started.

$$X1 = (1-\lambda) \times Mex \quad (3)$$

However, there is a discrepancy between the value X1 obtained by equation (3) and the actual stored oxygen decreasing speed, and the correction coefficients $\alpha 1$, $\alpha 2$, and $\alpha 3$ are coefficients for correcting this discrepancy. A parameter represented by "$1-\lambda$" is hereinafter referred to as air shortage amount.

First Correction Coefficient

Figure 5:
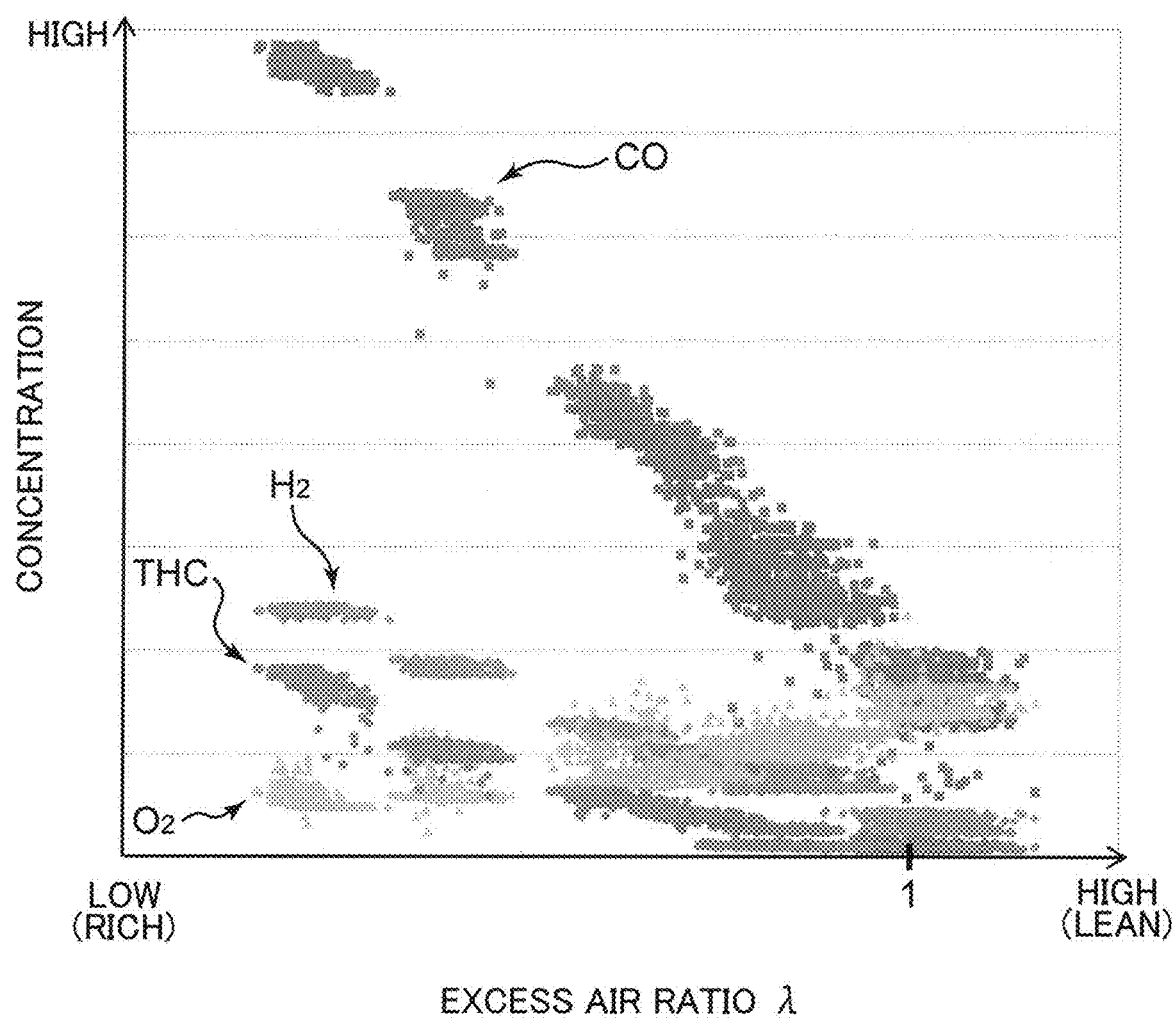
FIG. 5 is a graph showing a relationship between an excess air ratio of an exhaust gas and concentrations of substances contained in the exhaust gas.

The present inventors have earnestly studied to decrease the discrepancy and have determined that FIG. 5 shows concentrations of the reducing agents CO, $H_2$, and THC discharged from the engine body 1 when the excess air ratio $\lambda$ of the exhaust gas is 1 or less. Also, FIG. 5 shows that even if the excess air ratio $\lambda$ of the exhaust gas is 1 or less, the exhaust gas discharged from the engine body 1 contains oxygen ($O_2$).

Specifically, in FIG. 5, the horizontal axis represents the excess air ratio $\lambda$ of the exhaust gas, whereas the vertical axis represents concentrations of substances (carbon monoxide CO, hydrogen $H_2$, total hydrocarbon THC, oxygen $O_2$) in the exhaust gas. As shown in FIG. 5, the concentrations of CO, $H_2$, and THC contained in the exhaust gas increase as the excess air ratio $\lambda$ of the exhaust gas decreases, whereas the concentration of $O_2$ contained in the exhaust gas decreases as the excess air ratio $\lambda$ of the exhaust gas increases.

Also, the present inventors have determined that in addition to CO mainly contained in the exhaust gas, the quantity of $H_2$ affects the stored oxygen decreasing speed. This is considered because $H_2$ has a high reduction capability and is likely to react with oxygen stored in the NOx catalyst 41 (hereinafter referred to as stored oxygen as appropriate). Also, the present inventors have determined that $O_2$ contained in the exhaust gas inhibits decrease in the stored oxygen, and that the quantity of $O_2$ contained in the exhaust gas affects the stored oxygen decreasing speed.

From such knowledge, the present inventors have determined that the quantity of the reducing agent that actually reacts with the stored oxygen in the NOx catalyst 41 approximates a value obtained by subtracting, from the total quantity of CO and $H_2$ contained in the exhaust gas, the quantity of half of the quantity of $O_2$ that is the quantity of $O_2$ reacting with CO and $H_2$, the quantity of $O_2$ being contained in the exhaust gas.

Figure 6:
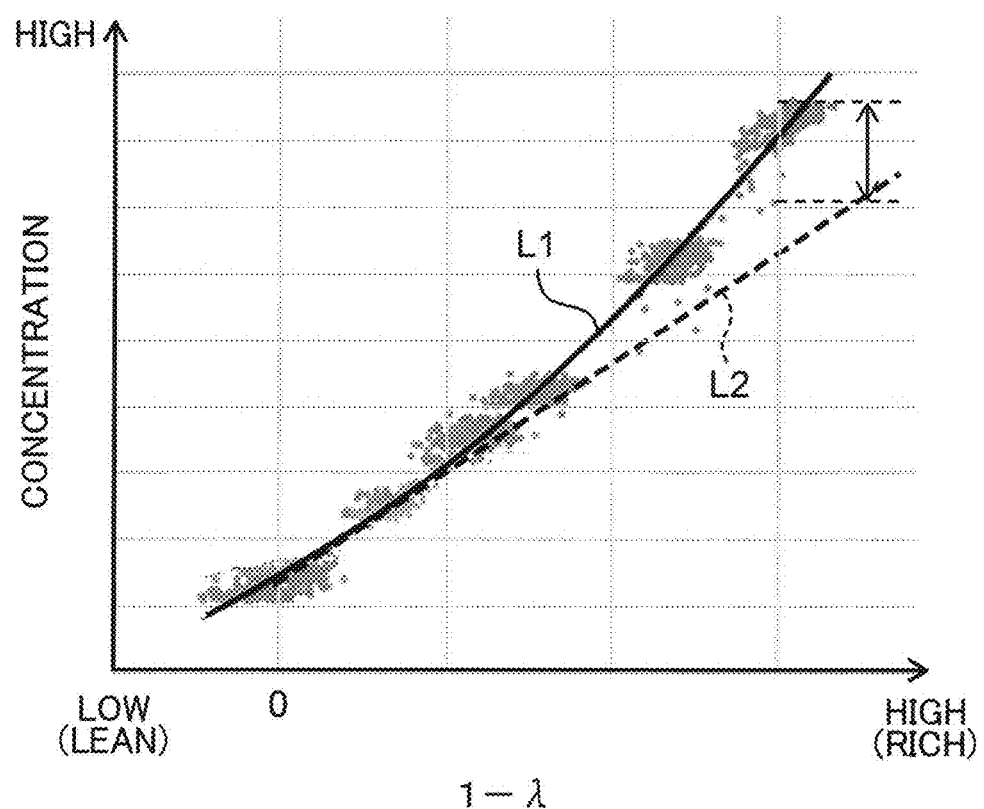
FIG. 6 is a graph showing a relationship between an air shortage amount of the exhaust gas and the concentrations of substances contained in the exhaust gas.

Here, the vertical axis of FIG. 6 represents a value obtained by subtracting the value of half of the concentration of $O_2$ contained in the exhaust gas from the total value of the concentrations of CO and $H_2$ contained in the exhaust gas. That is, the value of this vertical axis is the concentration of the reducing agent that is considered to react with the stored oxygen in the NOx catalyst 41 (hereinafter referred to as net concentration of the reducing agent). FIG. 6 is a graph with the net concentration of the reducing agent plotted for each air shortage amount of the exhaust gas ("$1-\lambda$"). In FIG. 6, a line L1 shown as a solid line is a line connecting typical points of the plotted points.

As shown in FIG. 6, the net concentration of the reducing agent increases as the excess air ratio $\lambda$ of the exhaust gas decreases (as the exhaust gas becomes richer).

However, as the air shortage amount of the exhaust gas increases (as the excess air ratio $\lambda$ of the exhaust gas decreases), a variation rate of the net concentration of the reducing agent with respect to the air shortage amount of the exhaust gas and the excess air ratio $\lambda$ of the exhaust gas increases, and the net concentration of the reducing agent is not proportional to the air shortage amount. That is, there is a discrepancy between a line L2 that is a line connecting points calculated by equation (3) and a line L1 connecting points proportional to the air shortage amount for each air shortage amount. It is considered that this discrepancy between the line L1 and the line L2 constitutes at least part of a discrepancy between the value of X1 obtained by equation (3) and the actual stored oxygen decreasing speed.

Figure 7:
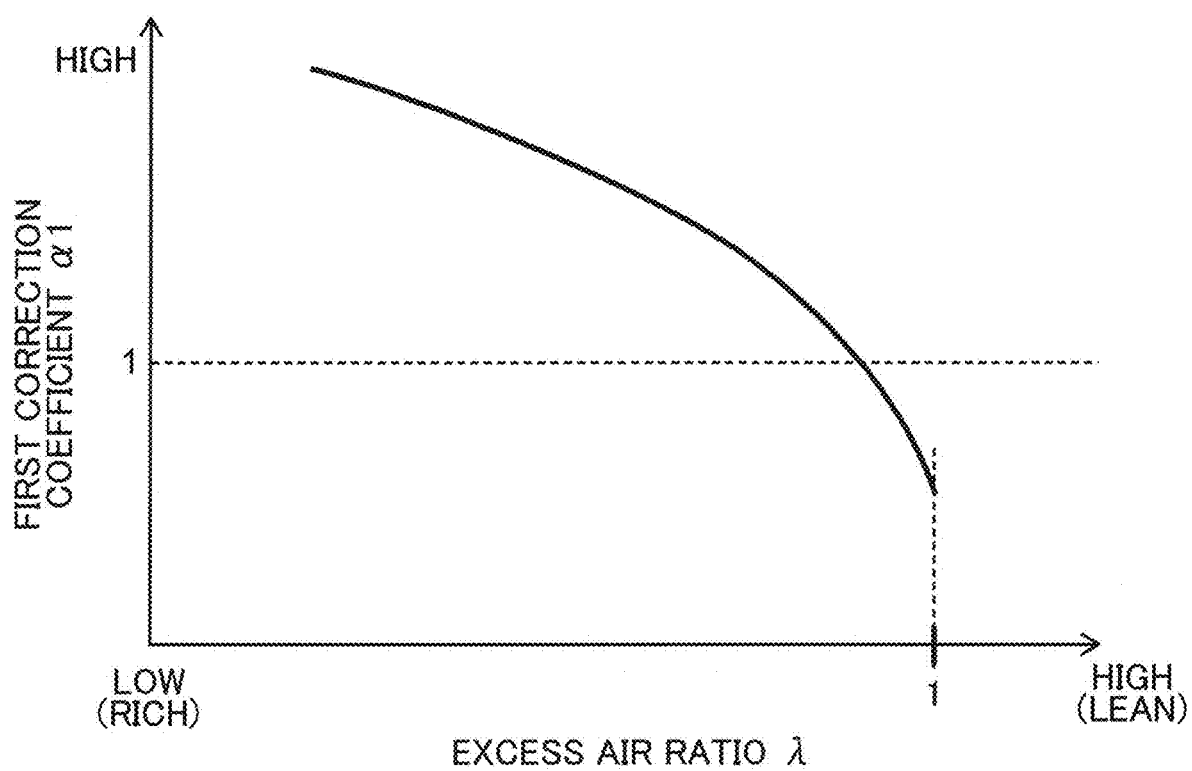
FIG. 7 is a graph showing a relationship between the excess air ratio and a first correction coefficient.

The first correction coefficient $\alpha 1$ is a coefficient for correcting this discrepancy, that is, a coefficient for correcting points on the line L1 to points on the line L2. The first correction coefficient $\alpha 1$ is set as shown in FIG. 7.

Specifically, the first correction coefficient $\alpha 1$ is set such that the value of $\alpha 1$ increases as the excess air ratio $\lambda$ of the exhaust gas decreases. Also, the first correction coefficient $\alpha 1$ is set such that the variation rate of the first correction coefficient $\alpha 1$ with respect to the excess air ratio $\lambda$ of the exhaust gas increases as the excess air ratio $\lambda$ of the exhaust gas increases.

Second Correction Coefficient and Third Correction Coefficient

The present inventors have determined that depending on the temperature of the NOx catalyst 41 and the exhaust flow rate, not all reducing agents introduced into the NOx catalyst 41 are oxidized even during DeNOx control. Also, the present inventors have determined that depending on the temperature of the NOx catalyst 41 and the exhaust flow rate, a proportion of the reducing agent oxidized by the stored oxygen in the NOx catalyst 41 during DeNOx control differs.

Figure 8:
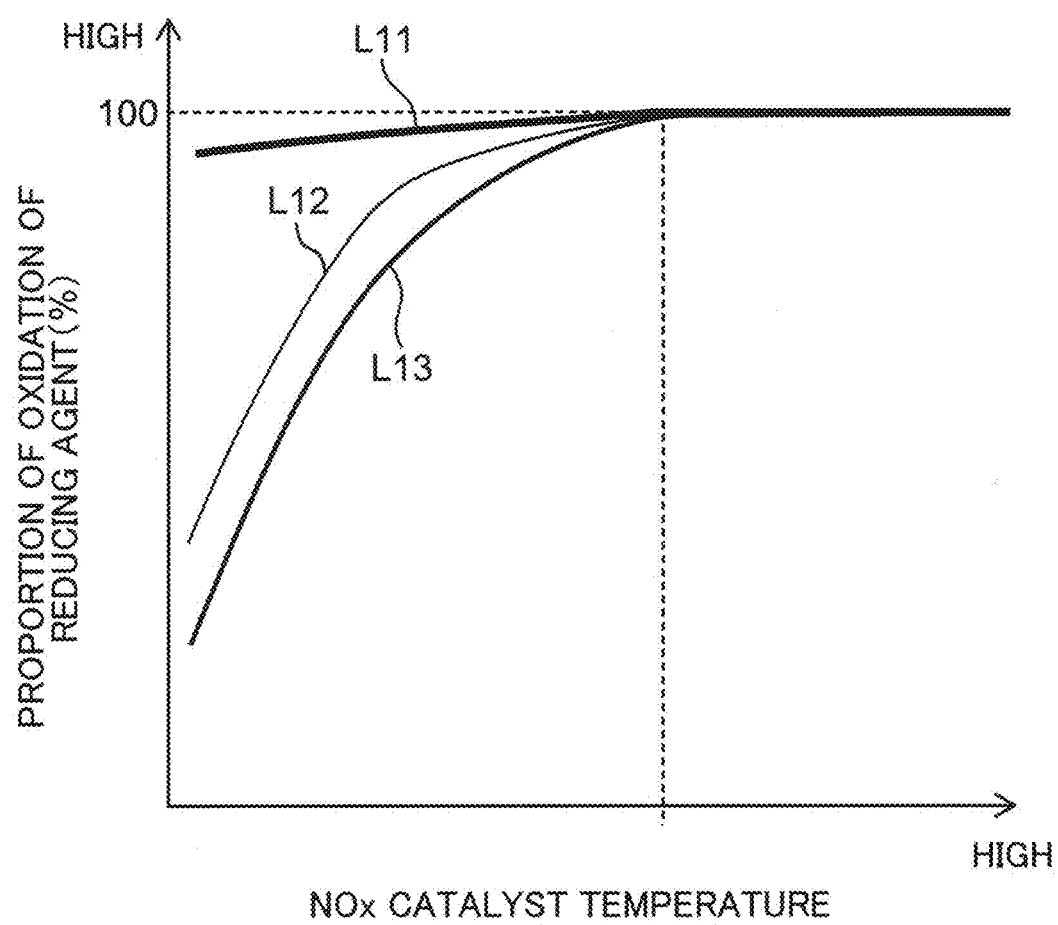
FIG. 8 is a graph showing a relationship among a temperature of an NOx catalyst, an exhaust flow rate, and a proportion of a reducing agent to be oxidized.

FIG. 8 is a graph with the temperature of the NOx catalyst 41 plotted on the horizontal axis and the proportion that the reducing agent introduced into the NOx catalyst 41 is oxidized during DeNOx control plotted on the vertical axis. Three lines L11, L12, and L13 in the graph of FIG. 8 are lines with the exhaust flow rate different from one another. The exhaust flow rate increases in order from the lines L11, L12, and L13.

As shown in FIG. 8, the proportion decreases as the temperature of the NOx catalyst 41 decreases. In more detail, when the temperature of the NOx catalyst 41 is equal to or higher than a predetermined temperature (for example, about 350° C.), the proportion will be 100%, and almost all of the reducing agent introduced into the NOx catalyst 41 is oxidized. On the other hand, when the temperature of the NOx catalyst 41 is less than the predetermined temperature, the proportion decreases as the temperature of the NOx catalyst 41 decreases. In addition, the proportion decreases as the exhaust flow rate increases.

Therefore, not only the quantity of the reducing agent actually oxidized by the stored oxygen in the NOx catalyst 41 but also the quantity of the stored oxygen used for oxidization is a value obtained by multiplying a value obtained by $(1-\lambda) \times Mex \times \alpha 1$ (value estimated to be the total quantity of the reducing agent introduced into the NOx catalyst 41 and the quantity of the stored oxygen corresponding to this total quantity) by the proportion.

Therefore, in the present embodiment, the proportion that varies with the temperature of the NOx catalyst 41 is set as the second correction coefficient α2. In addition, the proportion that varies with the exhaust flow rate is set as the third correction coefficient α3. Then, (1−λ)×Me×α1 is multiplied by α2 and α3 to estimate, more accurately, not only the quantity of the reducing agent oxidized by the stored oxygen in the NOx catalyst 41 but also the quantity of the stored oxygen used for this oxidization.

The second correction coefficient α2, that is, the proportion that varies with the temperature of the NOx catalyst 41 decreases as the temperature of the NOx catalyst 41 decreases, as described above.

The third correction coefficient α3, that is, the proportion that varies with the exhaust flow rate decreases as the exhaust flow rate increases, as described above.

The second correction coefficient α2 and the third correction coefficient α3 are constant (for example, 1.0) regardless of the temperature of the NOx catalyst 41 and the value of the exhaust flow rate when the temperature of the NOx catalyst 41 is equal to or higher than a predetermined temperature.

It is considered that the proportion increases as the temperature of the NOx catalyst 41 increases because the NOx catalyst 41 is activated more and an oxidation reaction of the reducing agent is promoted more as the temperature of the NOx catalyst 41 increases. Also, it is considered that the proportion decreases as the exhaust flow rate increases because the quantity of substances other than the reducing agent also increases as the exhaust flow rate increases, and a chance of contact between the NOx catalyst 41 and the reducing agent decreases.

In this way, in the present embodiment, the stored oxygen decreasing speed is estimated accurately by equation (2).

In the present embodiment, the $NH_3$ release start time is estimated by using the stored oxygen decreasing speed estimated in this way. Specifically, as described above, the time when the estimated integrated value of the stored oxygen decreasing speed becomes equal to or greater than the stored oxygen maximum quantity is estimated as the $NH_3$ release start time.

(3-4) Target Value for Excess Air Ratio During DeNOx Control

As described above, NOx is reduced in the NOx catalyst 41 by setting the exhaust gas to be introduced in a rich state where the excess air ratio λ is near 1 or less than 1. Therefore, in order to only reduce NOx within the NOx catalyst 41, the excess air ratio λ of the exhaust gas may be near 1.

However, the NOx catalyst 41 has an oxygen storage capability, and when the excess air ratio λ of the exhaust gas becomes equal to or greater than 1, the NOx catalyst 41 stores oxygen. When oxygen is stored in the NOx catalyst 41, the release of $NH_3$ from the NOx catalyst 41 is stopped until this stored oxygen is decreased to zero.

Therefore, in the present embodiment, in order to supply $NH_3$ to the SCR catalyst 46 efficiently, the excess air ratio λ of the exhaust gas is set at less than 1. Specifically, by setting the excess air ratio λ of the exhaust gas at less than 1 and releasing $NH_3$ from the NOx catalyst 41, the quantity of urea to be injected from the urea injector 45 is decreased and the decrease in urea within the urea tank 45c is inhibited. Particularly, it is known that when the excess air ratio λ of the exhaust gas becomes equal to or greater than 1, a large quantity of oxygen is stored in the NOx catalyst 41 for a short time, resulting in suspension of the release of $NH_3$ from the NOx catalyst 41 over a relatively long time.

Therefore, in order to release a large quantity of $NH_3$ from the NOx catalyst 41 within a certain period of time, the excess air ratio λ of the exhaust gas is set at less than 1.

However, the excess air ratio λ of the exhaust gas varies with the air quantity and the fuel quantity to be introduced into the cylinder 2. Therefore, when the target value for the excess air ratio λ of the exhaust gas is set as a value extremely close to 1, this will lead to an increase in a chance for the actual excess air ratio λ of the exhaust gas to become equal to or greater than 1 following the fluctuation of the air quantity or the fuel quantity. Since the release of $NH_3$ will be suspended when the excess air ratio λ of the exhaust gas becomes equal to or greater than 1 as described above, a fluctuation of the excess air ratio λ of the exhaust gas across 1 will lead to a large fluctuation of $NH_3$ to be supplied to the SCR catalyst 46. Therefore, in order to supply $NH_3$ to the SCR catalyst 46 efficiently and stably, in the present embodiment, the target value for the excess air ratio λ of the exhaust gas is set at less than 0.98.

Meanwhile, as shown in FIG. 5, when the excess air ratio λ of the exhaust gas decreases, a variation width of the quantity of the reducing agent in the exhaust gas increases as the quantity of the reducing agent in the exhaust gas increases. Therefore, if the excess air ratio λ of the exhaust gas is decreased excessively, not only $NH_3$ released from the NOx catalyst 41 but also $NH_3$ within the SCR catalyst 46 become unstable. Particularly, when the excess air ratio λ of the exhaust gas becomes 0.9 or less, the variation width of the quantity of the reducing agent in the exhaust gas becomes equal to or greater than a predetermined value. Therefore, in the present embodiment, the target value for the excess air ratio λ of the exhaust gas is set larger than 0.9. That is, in the present embodiment, the target value for the excess air ratio λ of the exhaust gas during DeNOx control is set at a value that is larger than 0.9 and less than 0.98.

For example, in a low load side first area R1_L with a low engine load of the first area R1, the target value for the excess air ratio λ of not only the air-fuel mixture but also the exhaust gas is set at 0.98. In an area other than the low load side first area R1_L of the first area R1 and the second area R2, the target value for the excess air ratio λ of not only the air-fuel mixture but also the exhaust gas is set at 0.96.

Figure 9:
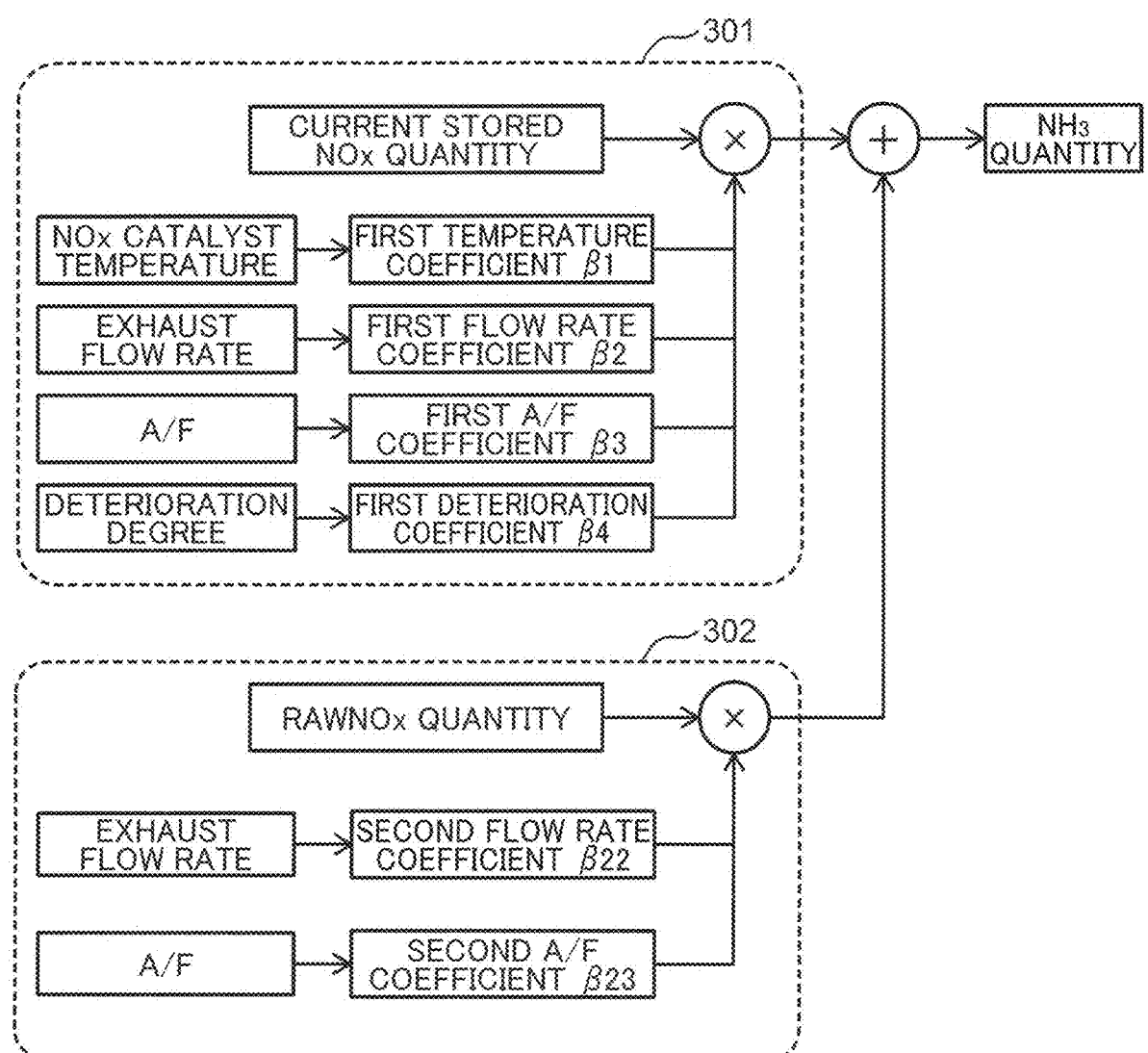
FIG. 9 is diagram for describing a procedure for estimating an $NH_3$ quantity to be released from the NOx catalyst.

(3-5) Procedure for Estimating $NH_3$ Quantity to be Released from NOx Catalyst Next, the procedure for estimating the $NH_3$ quantity to be released from the NOx catalyst 41 during DeNOx control will be described. FIG. 9 is a diagram for describing this procedure.

In the present embodiment, the DCU 300 functionally includes a first estimation unit 301 and a second estimation unit 302.

During DeNOx control, the first estimation unit 301 estimates the quantity of $NH_3$ generated through coupling of NOx stored in the NOx catalyst 41 and H or the like that is the reducing agent (hereinafter this $NH_3$ is referred to as first $NH_3$ as appropriate).

During DeNOx control, the second estimation unit 302 estimates the quantity of $NH_3$ generated through coupling of NOx generated in the engine body 1 and flowing into the NOx catalyst 41 (hereinafter this NOx is referred to as Raw NOx as appropriate) and H or the like that is the reducing agent in the NOx catalyst 41 (hereinafter this $NH_3$ is referred to as second $NH_3$ as appropriate).

The first estimation unit 301 first estimates the current NOx storage quantity in the NOx catalyst 41. Next, the first estimation unit 301 calculates the quantity of the first NH$_3$ by multiplying the estimate value of the NOx storage quantity by a first temperature coefficient β1, a first flow rate coefficient β2, a first A/F coefficient β3, and a first deterioration coefficient β4.

Figure 10:
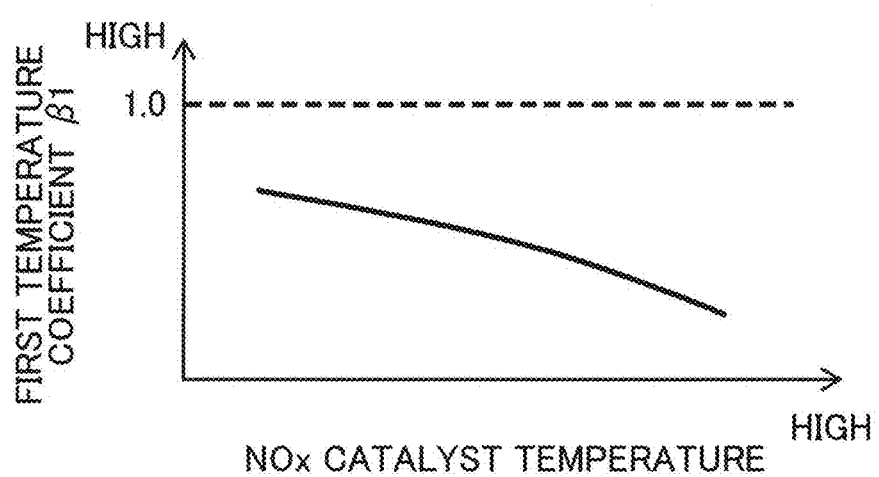
FIG. 10 is a graph showing a relationship between the temperature of the NOx catalyst and a first temperature coefficient.

The first temperature coefficient β1 is a coefficient that is set based on a map shown in FIG. 10, and is set according to the temperature of the NOx catalyst 41. Specifically, the first temperature coefficient β1 decreases as the temperature of the NOx catalyst 41 increases. It is known that a reaction to convert NOx stored in the NOx catalyst 41 into NH$_3$ is promoted more as the temperature of the NOx catalyst 41 increases. Accordingly, the first temperature coefficient β1 is set such that the first NH$_3$ quantity increases as the temperature of the NOx catalyst 41 increases.

Figure 11:
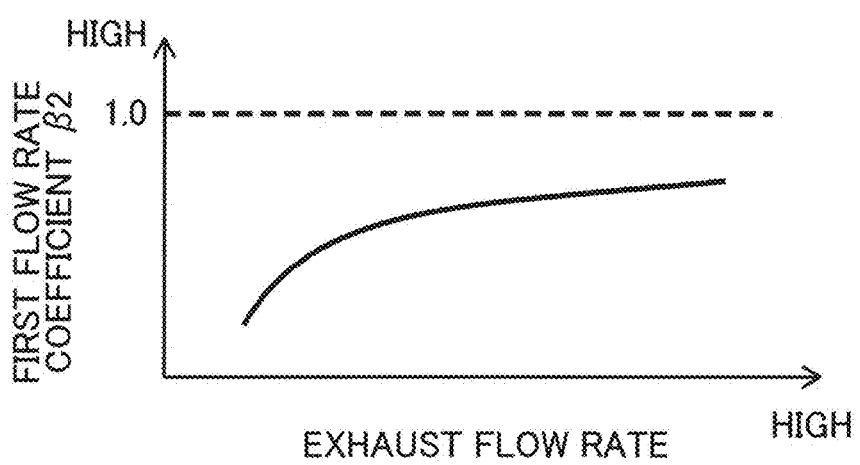
FIG. 11 is a graph showing a relationship between the exhaust flow rate and a first flow rate coefficient.

The first flow rate coefficient β2 is a coefficient that is set based on a map shown in FIG. 11, and is set according to the exhaust flow rate. Specifically, the first flow rate coefficient 132 increases as the exhaust flow rate increases. As the exhaust flow rate increases, the quantity of the reducing agent flowing into the NOx catalyst 41 increases, and the NH$_3$ quantity released from the NOx catalyst 41 increases. Correspondingly, the first flow rate coefficient β2 is set such that the first NH$_3$ quantity is calculated more greatly as the exhaust flow rate increases.

Figure 12:
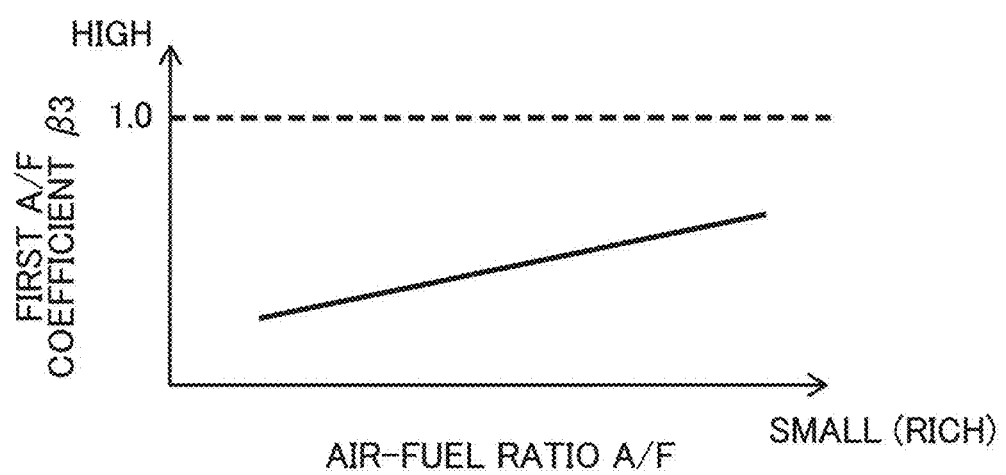
FIG. 12 is a graph showing a relationship between an air-fuel ratio of the exhaust gas and a first A/F coefficient.

The first A/F coefficient β3 is a coefficient that is set based on a map shown in FIG. 12, and is set according to the air-fuel ratio (A/F) of the exhaust gas. Specifically, the first A/F coefficient β3 increases as the air-fuel ratio of the exhaust gas decreases (becomes richer). As the air-fuel ratio of the exhaust gas becomes richer, the quantity of the reducing agent flowing into the NOx catalyst 41 increases, and the NH$_3$ quantity released from the NOx catalyst 41 increases. Correspondingly, the first A/F coefficient β3 is set such that the first NH$_3$ quantity is calculated more greatly as the exhaust flow rate increases.

The first deterioration coefficient β4 is a coefficient that is set according to a deterioration degree of the NOx catalyst 41. The PCM 200 estimates the deterioration degree of the NOx catalyst 41 based on information such as running time of a vehicle and the number of times of executing DeNOx control. The first deterioration coefficient β4 increases as this estimated deterioration degree increases (as deterioration progresses). It is known that a reaction to convert NOx stored in the NOx catalyst 41 into NH$_3$ is promoted more as the deterioration degree of the NOx catalyst 41 increases. Correspondingly, the first deterioration coefficient β4 is set such that the first NH$_3$ quantity increases as the deterioration degree increases.

The second estimation unit 302 first estimates the quantity (flow rate) of raw NOx discharged from the engine body 1. In the present embodiment, the flow rate of raw NOx is estimated from the exhaust flow rate, the excess air ratio λ of the air-fuel mixture, and other information. Next, the second estimation unit 302 calculates the quantity of the second NH$_3$ by multiplying the estimated value of the flow rate of raw NOx by the second flow rate coefficient β22 and the second A/F coefficient β23.

Figure 13:
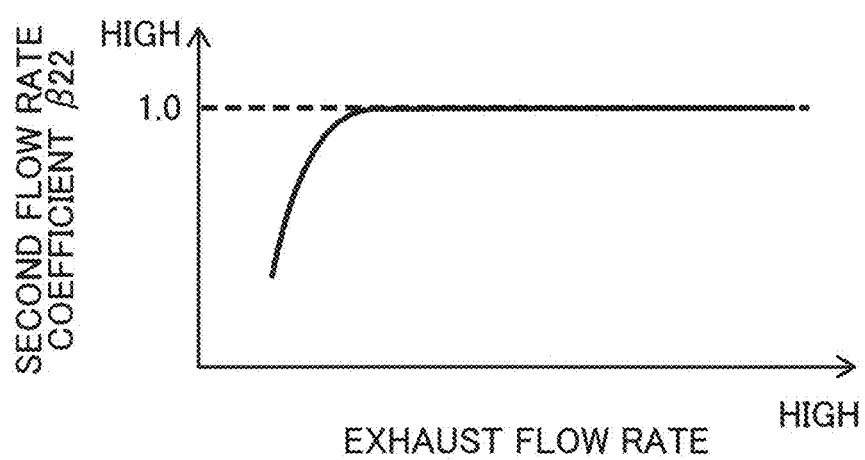
FIG. 13 is a graph showing a relationship between the exhaust flow rate and a second flow rate coefficient.

The second flow rate coefficient β22 is a coefficient that is set based on a map shown in FIG. 13, and is set according to the exhaust flow rate. Specifically, the second flow rate coefficient β22 increases as the exhaust flow rate increases, in a similar manner to the first flow rate coefficient β2. However, unlike NOx stored in the NOx catalyst 41, when the exhaust flow rate becomes equal to or greater than a predetermined value, an influence of the exhaust flow rate on raw NOx will become equivalent, and the second flow rate coefficient β22 has a constant value.

Figure 14:
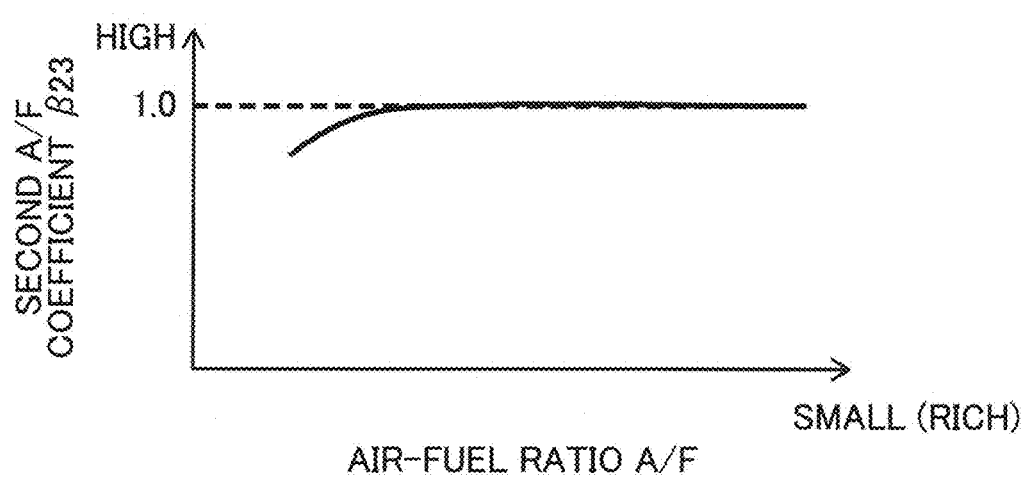
FIG. 14 is a graph showing a relationship between the air-fuel ratio of the exhaust gas and a second A/F coefficient.

The second A/F coefficient β23 is a coefficient that is set based on a map shown in FIG. 14, and is set according to the air-fuel ratio (A/F) of the exhaust gas. Specifically, the second A/F coefficient β23 increases as the air-fuel ratio of the exhaust gas decreases (becomes richer), in a similar manner to the second A/F coefficient β3. However, unlike NOx stored in the NOx catalyst 41, when the air-fuel ratio of the exhaust gas becomes equal to or less than a predetermined value, an influence of the air-fuel ratio of the exhaust gas on raw NOx will become equivalent, and the second A/F coefficient β23 has a constant value when the air-fuel ratio of the exhaust gas becomes equal to or greater than the predetermined value.

Thus, in the present embodiment, the quantity of first NH$_3$ and the quantity of second NH$_3$ are estimated. Then, the DCU 300 calculates the quantity obtained by adding the quantity of first NH$_3$ and the quantity of second NH$_3$ as NH$_3$ released from the NOx catalyst 41 during DeNOx control (in detail, during a period from NH$_3$ release start time to DeNOx control end time).

(3-6) Urea Injection Quantity Control Flow

Figure 15:
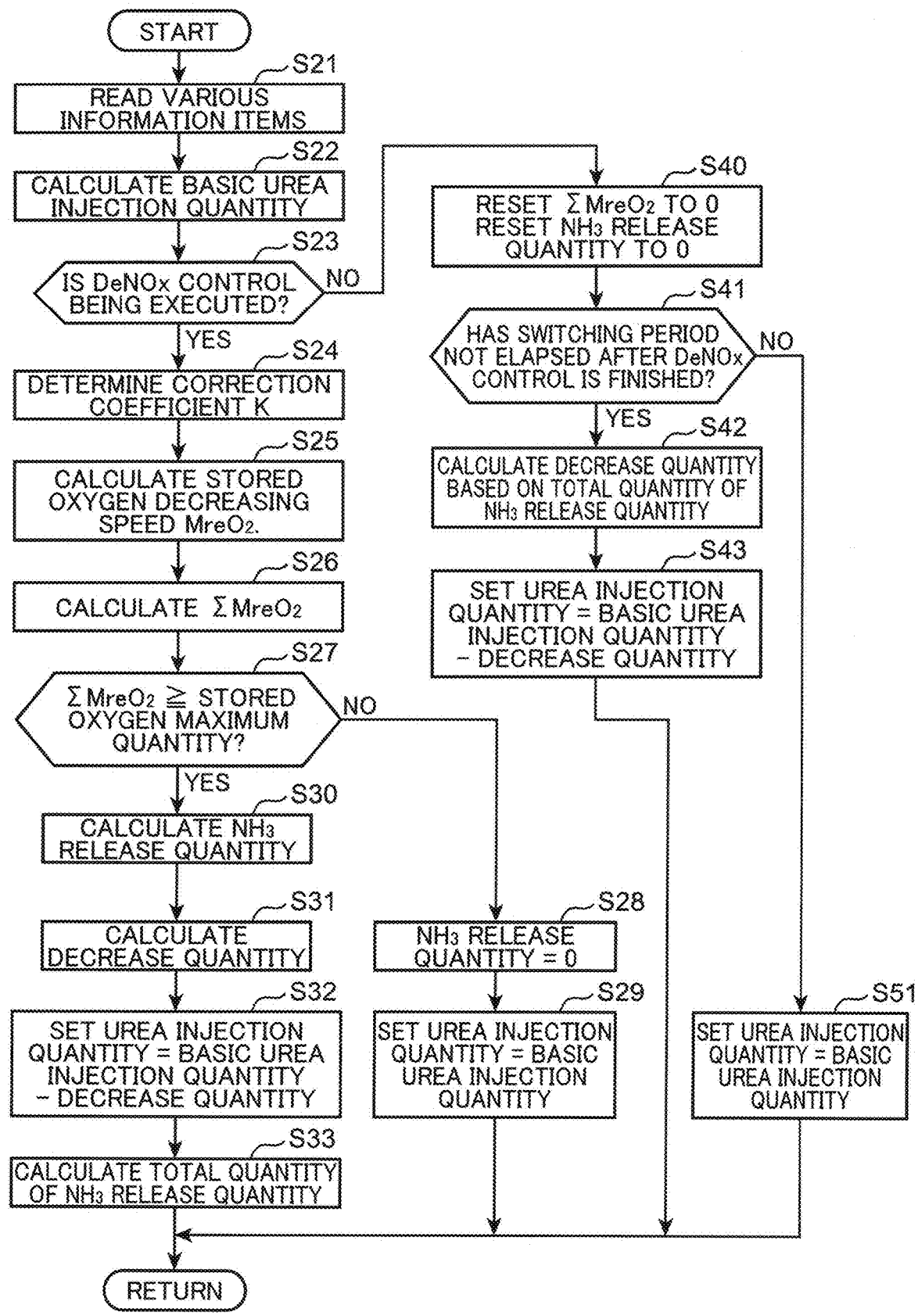
FIG. 15 is a flowchart showing a procedure for controlling a urea injection quantity.

FIG. 15 is a flowchart showing a procedure for controlling the urea injection quantity. An overall control flow of the urea injection quantity will be described with reference to this flowchart. Note that FIG. 15 shows a control flow when both the SCR catalyst 46 and the NOx catalyst 41 purify NOx.

First, in step S21, the DCU 300 acquires various information items on a vehicle including the engine rotation speed, the engine load, the excess air ratio λ of the air-fuel mixture and the exhaust gas, the temperature of the NOx catalyst 41, and the exhaust flow rate.

Next, in step S22, as will be described later, the DCU 300 calculates a basic urea injection quantity, which is a value of the urea injection quantity in the normal operation excluding a period while DeNOx control is not executed and the switching period. In the present embodiment, the basic urea injection quantity is determined based on engine operating conditions and the like so as to maintain the NH$_3$ quantity adsorbed in the SCR catalyst 46 at a predetermined quantity.

Next, in step S23, the DCU 300 determines whether DeNOx control is being executed. In the present embodiment, a flag is set that becomes "1" while active DeNOx control or passive DeNOx control is executed and otherwise becomes "0". In step S23, the DCU 300 determines whether this flag is 1.

If the determination in step S23 is YES, the process proceeds to step S24. In step S24, the DCU 300 determines a value of the correction coefficient K. Specifically, the DCU 300 determines the value of the correction coefficient K by K=α1×α2×α3.

Here, the first correction coefficient α1 is calculated from a map shown in FIG. 7 according to the excess air ratio λ of the exhaust gas. Specifically, the map shown in FIG. 7 has been stored in the DCU 300. The DCU 300 extracts a value corresponding to the current excess air ratio λ of the exhaust gas from this map.

Also, a map shown in FIG. 8 has been stored in the DCU 300. The DCU 300 extracts a value corresponding to the current exhaust flow rate and the temperature of the NOx catalyst 41 from this map, and uses this value as a value of α2×α3.

After step S24, the process proceeds to step S25. In step S25, the DCU 300 calculates the stored oxygen decreasing speed $MreO_2$. Specifically, the DCU 300 calculates the stored oxygen decreasing speed $MreO_2$ by equation (2) by using the correction coefficient K determined in step S24, and the exhaust flow rate and the excess air ratio λ of the exhaust gas read in step S21.

After step S25, the process proceeds to step S26. In step S26, the DCU 300 integrates the stored oxygen decreasing speed $MreO_2$ calculated in step S25. That is, the DCU 300 calculates $\Sigma MreO_2$, and calculates the stored oxygen quantity in the NOx catalyst 41 that has decreased until now following the start of DeNOx control.

After step S26, the process proceeds to step S27. In step S27, the DCU 300 determines whether $\Sigma MreO_2$ calculated in step S26 is equal to or greater than the stored oxygen maximum quantity, that is, whether the $NH_3$ release start time has been reached. Note that as described above, the stored oxygen maximum quantity has been set in advance and stored in the DCU 300.

When the determination of step S27 is NO, that is, when $\Sigma MreO_2$ is less than the stored oxygen maximum quantity and it is estimated that the $NH_3$ release start time has not been reached, the process proceeds to step S28. In step S28, the $NH_3$ release quantity, that is, the $NH_3$ release quantity from the NOx catalyst 41 is set at 0. After step S28, the process proceeds to step S29, and the final urea injection quantity (to be actually injected) is set as the basic urea injection quantity calculated in step S22. After step S29, the DCU 300 ends the process (returns to step S21).

On the other hand, when the determination of step S27 is YES, $\Sigma MreO_2$ is equal to or greater than the stored oxygen maximum quantity, and it is estimated that the $NH_3$ release start time has been reached or exceeded, then the process proceeds to step S30. In step S30, the $NH_3$ release quantity, that is, the $NH_3$ release quantity from the NOx catalyst 41 is calculated by the procedure described in (3-5).

After step S30, the process proceeds to step S31. In step S31, the DCU 300 calculates a value obtained by converting the $NH_3$ release quantity calculated in step S30 into urea as a decrease quantity.

After step S31, the process proceeds to step S32. In step S32, the DCU 300 subtracts the decrease quantity (the value obtained by converting the $NH_3$ release quantity into urea) calculated in step S31 from the basic urea injection quantity calculated in step S22, and then sets the value as the final urea injection quantity.

After step S32, the process proceeds to step S33. In step S33, the DCU300 integrates the $NH_3$ release quantity calculated in step S31, and calculates the total quantity of $NH_3$ released from the NOx catalyst 41 after the $NH_3$ release start time. After step S32, the DCU 300 ends the process (returns to step S21).

In this way, in the present embodiment, even while DeNOx control is executed, the urea injection quantity is subtracted from the basic urea injection quantity only after the determination in step S27 becomes YES and the $NH_3$ release start time is reached. Therefore, as the stored oxygen decreasing speed increases and the time from the start of DeNOx control to reaching the $NH_3$ release start time decreases, the time when the subtraction is executed increases, and the total urea injection quantity to be supplied to the exhaust passage 40 while DeNOx control is executed decreases.

As described above, the basic urea injection quantity is adjusted as appropriate so as to maintain the $NH_3$ quantity adsorbed in the SCR catalyst 46 at a predetermined quantity. However, when the decrease quantity exceeding the basic urea injection quantity is required, it is required at least to subtract the exceeding decrease quantity from the basic urea injection quantity after DeNOx control is finished.

On the other hand, if the determination in step S23 is NO, the process proceeds to step S40.

In step S40, the DCU 300 resets the integrated value of the stored oxygen decreasing speed ($\Sigma MreO_2$) to 0, and resets the $NH_3$ release quantity from the NOx catalyst 41 to 0. Note that the total quantity of $NH_3$ release quantity is stored.

After step S40, the process proceeds to step S41. In step S41, the DCU 300 determines whether the switching period (this is set in advance as described above) has elapsed after DeNOx control is finished.

If the determination in step S41 is YES, the process proceeds to step S42. In step S42, the decrease quantity of the urea injection quantity is determined based on the total quantity of $NH_3$ calculated in step S33 while immediately preceding DeNOx control is executed, the total quantity of $NH_3$ being released from the NOx catalyst 41 following DeNOx control execution. As described above, in the present embodiment, the urea injection quantity is determined such that the decrease quantity increases as the total quantity of $NH_3$ increases. As described above, the decrease quantity calculated in step S42 (decrease quantity during the switching period) is set at a value smaller than the decrease quantity calculated in step S31 (decrease quantity during DeNOx control).

After step S42, the process proceeds to step S43. In step S43, the DCU 300 determines a value obtained by subtracting the decrease quantity calculated in step S42 from the basic urea injection quantity calculated in step S22 as the final urea injection quantity. After step S43, the DCU 300 ends the process (returns to step S21).

On the other hand, when the determination in step S41 is NO, that is, when decrease of the urea injection quantity of the quantity corresponding to the total quantity of the $NH_3$ release quantity generated during DeNOx control is finished, the process proceeds to step S51. In step S51, the final urea injection quantity is set as the basic value of the urea injection quantity calculated in step S22. After step S51, the DCU 300 ends the process (returns to step S21).

(4) Operations

As described above, in the present embodiment, the urea injection quantity is decreased more while DeNOx control is executed than while DeNOx control is not executed. Therefore, during DeNOx control, it is possible to inhibit $NH_3$ to be supplied to the SCR catalyst 46 from becoming excessive and to inhibit $NH_3$ from slipping downstream from the SCR catalyst 46.

Then, the urea injection quantity is changed according to the stored oxygen decreasing speed during DeNOx control. Specifically, as the stored oxygen decreasing speed increases and the time from the start of DeNOx control to the start of release of $NH_3$ from the NOx catalyst 41 (lag time) decreases, the urea injection quantity decreases.

Therefore, it is possible to control the $NH_3$ quantity to be supplied to the SCR catalyst 46 at an appropriate quantity without fail. This makes it possible to inhibit $NH_3$ from slipping downstream from the SCR catalyst 46 and to purify NOx appropriately in the SCR catalyst 46.

In detail, it is possible to prevent a large quantity of $NH_3$ from being supplied from the urea injector 45 to the SCR catalyst 46 in a state where a lot of $NH_3$ is released from the NOx catalyst 41 and a lot of $NH_3$ is stored (adsorbed) in the SCR catalyst 46, following the short lag time. This makes it possible to inhibit $NH_3$ from slipping downstream from the SCR catalyst 46, without being adsorbed in the SCR catalyst 46. Also, it is possible to prevent that only a small quantity of $NH_3$ is supplied from the urea injector 45 to the SCR catalyst 46 in a state where only a small quantity of $NH_3$ is introduced from the NOx catalyst 41 to the SCR catalyst 46 and a small quantity of $NH_3$ is stored in the SCR catalyst 46, following the long lag time. This makes it possible to secure the $NH_3$ quantity within the SCR catalyst 46 and to purify NOx appropriately.

Here, as described above, the stored oxygen decreasing speed is calculated by equation (2) so as to be proportional to the air shortage amount ("$1-\lambda$"). The first correction coefficient $\alpha1$ constituting the correction coefficient K in equation (2) is set as a value that increases as the excess air ratio $\lambda$ of the exhaust gas decreases. Therefore, the stored oxygen decreasing speed is calculated as a smaller value as the excess air ratio of the exhaust gas decreases, and during DeNOx control, the urea injection quantity decreases as the excess air ratio of the exhaust gas increases. That is, the stored oxygen decreasing speed is calculated as a small value and the urea injection quantity during DeNOx control becomes small when the excess air ratio $\lambda$ of the exhaust gas is small, as compared to when the excess air ratio $\lambda$ of the exhaust gas is large.

That is, in the present embodiment, during DeNOx control, by controlling the urea injector 45 such that the urea injection quantity decreases as the excess air ratio of the exhaust gas increases, the urea injection quantity is controlled to decrease as the stored oxygen decreasing speed decreases. This can produce an effect of changing the urea injection quantity appropriately according to the stored oxygen decreasing speed, and purifying NOx efficiently while preventing $NH_3$ from slipping.

Also, in the present embodiment, as shown in FIG. 7, the first correction coefficient $\alpha1$ is set such that the variation rate of the first correction coefficient $\alpha1$ with respect to the excess air ratio $\lambda$ of the exhaust gas increases as the excess air ratio $\lambda$ of the exhaust gas increases. Therefore, the urea injection quantity is controlled such that the variation rate of the urea injection quantity with respect to the excess air ratio of the exhaust gas increases as the excess air ratio of the exhaust gas increases. That is, the urea injection quantity is controlled such that the variation rate of the urea injection quantity with respect to the excess air ratio of the exhaust gas becomes large when the excess air ratio of the exhaust gas is large, as compared to when the excess air ratio of the exhaust gas is small.

That is, in the present embodiment, during DeNOx control, the urea injection quantity is set as a more appropriate value according to the stored oxygen decreasing speed, by controlling the urea injection quantity such that the variation rate of the urea injection quantity with respect to the excess air ratio increases as the excess air ratio of the exhaust gas increases. This can produce the above-described effect more securely.

Also, in the present embodiment, until the switching period elapses after DeNOx control is finished, the final urea injection quantity (to be actually injected) is smaller than the basic urea injection quantity, and the urea injection quantity is smaller than in other periods while DeNOx control is not executed.

Therefore, it is possible to prevent an excessive quantity of $NH_3$ from being supplied from the urea injector 45 in a state where a large quantity of $NH_3$ is adsorbed in the SCR catalyst 46 following DeNOx control execution. This makes it possible to purify NOx efficiently while preventing $NH_3$ from slipping downstream from the SCR catalyst 46.

In the present embodiment, the stored oxygen decreasing speed is calculated using the first correction coefficient $\alpha1$, the second correction coefficient $\alpha2$, and the third correction coefficient $\alpha3$. This enables accurate estimation of the stored oxygen decreasing speed. Since the stored oxygen decreasing speed is estimated accurately, the urea injection quantity to be adjusted according to the stored oxygen decreasing speed can be set as a more appropriate value. That is, the urea injection quantity can be controlled at a value that makes it possible to purify NOx efficiently while preventing $NH_3$ from slipping downstream from the SCR catalyst 46.

(5) Modification

The embodiment has described a case where the excess air ratio $\lambda$ of the exhaust gas is controlled at 0.96 or 0.98 during DeNOx control; however, a specific value of the excess air ratio $\lambda$ of the exhaust gas during DeNOx control is not limited to these values.

However, as described above, when the excess air ratio $\lambda$ of the exhaust gas is controlled at a value larger than 0.9 and less than 1.0 during DeNOx control, it is possible to supply $NH_3$ to the SCR catalyst 46 efficiently and stably.

The embodiment has described a case where the excess air ratio $\lambda$ of the exhaust gas is adjusted by executing post injection during DeNOx control; however, the excess air ratio $\lambda$ of the exhaust gas may be adjusted by changing the air quantity to be introduced into the cylinder 2. However, as described above, decreasing the air quantity could lead to deterioration in acceleration performance and deterioration in control accuracy of the excess air ratio $\lambda$. Therefore, as described above, during DeNOx control, it is preferable to control the excess air ratio $\lambda$ of the exhaust gas at a target value by changing the injection quantity of the post injection.

FIG. 15 has described a case where the urea injection quantity is decreased in a state where both the SCR catalyst 46 and the NOx catalyst 41 purify NOx. In contrast, when NOx is purified only in the NOx catalyst 41 and purification of NOx in the SCR catalyst 46 is started after DeNOx control is executed, the urea injection quantity after NOx purification starts in the SCR catalyst 46 can be calculated by subtracting the total quantity of the $NH_3$ release quantity calculated in step S33 from the basic urea injection quantity.

As described above, the present inventors have determined that when using the NOx storage and reduction type NOx catalyst having an oxygen storage capability, even if the regeneration control is executed for setting the excess air ratio of the exhaust gas at 1 or less and regenerating the NOx catalyst in order to reduce NOx stored in the NOx catalyst, $NH_3$ is not immediately released from the NOx catalyst, and predetermined lag time exists after starting the regeneration control until $NH_3$ starts to be released from the NOx catalyst. Furthermore, the present inventors have determined that there is a strong correlation between the lag time and the stored oxygen decreasing speed that is a decreasing speed of oxygen stored in the NOx catalyst, and that the lag time increases as the stored oxygen decreasing speed decreases. Here, as the lag time decreases, the $NH_3$ quantity that is released from the NOx catalyst and supplied to the SCR catalyst and stored in the SCR catalyst after the regeneration control is started increases. Therefore, during the regeneration control, if a fixed quantity of $NH_3$ or a material for $NH_3$ is separately supplied to the exhaust passage regardless of the lag time, $NH_3$ within the SCR catalyst could be excessive or insufficient.

Based on this knowledge, the present invention is an engine with an exhaust emission control device, the engine including: an engine body; a cylinder formed in the engine body; an exhaust passage through which an exhaust gas discharged from the engine body flows; an NOx catalyst provided in the exhaust passage; an SCR catalyst provided downstream from the NOx catalyst; an excess air ratio change device configured to change an excess air ratio of the exhaust gas; a reducing agent supply device configured to supply a reducing agent for SCR including a material for $NH_3$ or $NH_3$ between the NOx catalyst and the SCR catalyst in the exhaust passages; and a control device configured to control the excess air ratio change device and the reducing agent supply device, the control device being configured to execute regeneration control to regenerate the NOx catalyst by setting the excess air ratio of the exhaust gas at 1 or less by the excess air ratio change device, wherein the control device controls the reducing agent supply device in such a manner that a quantity of the reducing agent for SCR to be supplied from the reducing agent supply device to the exhaust passage becomes small when the excess air ratio of the exhaust gas during the regeneration is small, as compared to when the excess air ratio of the exhaust gas during the regeneration is large.

According to the knowledge of the present inventors, the stored oxygen decreasing speed that is the decreasing speed of oxygen stored in the NOx catalyst increases as the excess air ratio of the exhaust gas decreases.

In contrast, this device controls the quantity of the reducing agent for SCR to be supplied from the reducing agent supply device to the exhaust passage to be small when the excess air ratio of the exhaust gas during the regeneration control is small, as compared to when the excess air ratio of the exhaust gas during the regeneration control is large. That is, when the stored oxygen decreasing speed increases and the lag time decreases as the excess air ratio of the exhaust gas decreases, furthermore, when the total quantity of $NH_3$ that is released from the NOx catalyst and supplied to the SCR catalyst increases as the lag time decreases, the device decreases the quantity of the reducing agent for SCR to be supplied to the exhaust passage.

Therefore, during the regeneration control, it is possible to maintain the total quantity of $NH_3$ to be supplied to the SCR catalyst, the quantity being obtained by adding the quantity of $NH_3$ to be supplied from the NOx catalyst to the SCR catalyst to the quantity of $NH_3$ to be supplied from the reducing agent supply device to the SCR catalyst, at an appropriate quantity. It is also possible to inhibit $NH_3$ from slipping downstream from the SCR catalyst while purifying NOx appropriately in the SCR catalyst.

Also, according to the knowledge of the present inventors, the excess air ratio of the exhaust gas is not proportional to the stored oxygen decreasing speed, and the variation rate in the stored oxygen decreasing speed with respect to the excess air ratio of the exhaust gas increases as the excess air ratio of the exhaust gas increases.

Therefore, in the above-described configuration, the control device preferably controls the reducing agent supply device in such a manner that a variation rate of a supply quantity of the reducing agent for SCR with respect to the excess air ratio of the exhaust gas becomes large when the excess air ratio of the exhaust gas during the regeneration control is large, as compared to when the excess air ratio of the exhaust gas during the regeneration control is small.

This makes it possible to more certainly maintain the quantity obtained by adding $NH_3$ to be supplied from the NOx catalyst to the SCR catalyst to $NH_3$ to be supplied from the reducing agent supply device to the SCR catalyst at an appropriate quantity.

In the above-described configuration, it is preferable that the control device controls the reducing agent supply device to make the quantity of the reducing agent for SCR to be supplied from the reducing agent supply device to the exhaust passage smaller in a period after the regeneration control is finished until a predetermined period elapses, than in a period after the predetermined period elapses after the regeneration control is finished, the control device estimates $NH_3$ release start time that is time when $NH_3$ starts to release from the NOx catalyst following start of the regeneration control, and estimates a total quantity of $NH_3$ released from the NOx catalyst in a period from the $NH_3$ release start time to end time of the regeneration control, and the control device controls the reducing agent supply device in such a manner that the quantity of the reducing agent for SCR to be supplied from the reducing agent supply device to the exhaust passage in a period after the regeneration control is finished until the predetermined period elapses becomes small when the estimated total quantity of released $NH_3$ is large, as compared to when the estimated total quantity of released $NH_3$ is small.

This makes it possible to prevent a large quantity of reducing agent for SCR from being supplied to the SCR catalyst in a period from the time the regeneration control is finished to the time the predetermined period elapses, that is, in a period in which the $NH_3$ quantity in the SCR catalyst increases following execution of the regeneration control. This makes it possible to inhibit a large quantity of reducing agent for SCR from slipping downstream from the SCR catalyst.

The present invention provides an engine with an exhaust emission control device, the engine including: an engine body; a cylinder formed in the engine body; an exhaust passage through which an exhaust gas discharged from the engine body flows; an NOx catalyst provided in the exhaust passage; an SCR catalyst provided downstream from the NOx catalyst; an excess air ratio change device configured to change an excess air ratio of the exhaust gas; a reducing agent supply device configured to supply a reducing agent for SCR including a material for $NH_3$ or $NH_3$ between the NOx catalyst and the SCR catalyst in the exhaust passages; and a control device configured to control the excess air ratio change device and the reducing agent supply device, the control device being configured to execute regeneration control to regenerate the NOx catalyst by setting the excess air ratio of the exhaust gas at 1 or less by the excess air ratio change device, wherein during the regeneration control, the control device estimates an stored oxygen decreasing speed that is a speed at which oxygen stored in the NOx catalyst decreases, and the control device controls the reducing agent supply device in such a manner that a quantity of the reducing agent for SCR to be supplied from the reducing agent supply device to the exhaust passage becomes small when the stored oxygen decreasing speed is high, as compared to when the stored oxygen decreasing speed is low.

Also in this configuration, as the stored oxygen decreasing speed increases and the lag time decreases, furthermore, as the total quantity of $NH_3$ that is released from the NOx catalyst and supplied to the SCR catalyst increases, the quantity of the reducing agent for SCR to be supplied to the exhaust passage decreases. Therefore, it is possible to maintain the quantity obtained by adding the quantity of $NH_3$ to be supplied from the NOx catalyst to the SCR catalyst to the quantity of $NH_3$ to be supplied from the reducing agent supply device to the SCR catalyst at an appropriate quantity during the regeneration control. This makes it possible to inhibit $NH_3$ from slipping downstream from the SCR catalyst while purifying NOx appropriately in the SCR catalyst.

Here, it is known that the stored oxygen decreasing speed has a strong correlation with the excess air ratio of the exhaust gas and the flow rate of the exhaust gas.

Therefore, the control device preferably calculates the stored oxygen decreasing speed based on the excess air ratio of the exhaust gas and the flow rate of the exhaust gas.

This makes it possible to estimate the stored oxygen decreasing speed accurately.

In the above-described configuration, the control device preferably calculates the stored oxygen decreasing speed by equation (1) below:

$$MreO_2 = (1-\lambda) \times Mex \quad (1)$$

wherein the stored oxygen decreasing speed is $MreO_2$, the excess air ratio of the exhaust gas is $\lambda$, and the flow rate of the exhaust gas is $Mex$.

This makes it possible to calculate the stored oxygen decreasing speed accurately.

In the above-described configuration, it is preferable that the control device multiplies a value calculated by the equation (1) by a correction coefficient to correct the stored oxygen decreasing speed calculated by the equation (1), and the correction coefficient is set to increase as the excess air ratio of the exhaust gas decreases.

This configuration makes it possible to calculate the stored oxygen decreasing speed more accurately.

In the above-described configuration, the correction coefficient is preferably set to increase as the temperature of the NOx catalyst increases.

This configuration makes it possible to calculate the stored oxygen decreasing speed more accurately.

In the above-described configuration, the correction coefficient is preferably set to increase as the flow rate of the exhaust gas decreases.

This configuration makes it possible to calculate the stored oxygen decreasing speed more accurately.

This application is based on Japanese Patent application No. 2017-195216 filed in Japan Patent Office on Oct. 5, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed:

1. An engine with an exhaust emission control device, the engine comprising:
an engine body;
a cylinder formed in the engine body;
an exhaust passage through which an exhaust gas discharged from the engine body flows;
an NOx catalyst provided in the exhaust passage;
an SCR catalyst provided downstream from the NOx catalyst;
an excess air ratio change device configured to change an excess air ratio of the exhaust gas;
a reducing agent supply device configured to supply a reducing agent for SCR including a material for $NH_3$ or $NH_3$ between the NOx catalyst and the SCR catalyst in the exhaust passage; and
a control device configured to control the excess air ratio change device and the reducing agent supply device, the control device being configured to execute regeneration control to regenerate the NOx catalyst by setting the excess air ratio of the exhaust gas at 1 or less by the excess air ratio change device, wherein
the control device controls the reducing agent supply device in such a manner that a quantity of the reducing agent for SCR to be supplied from the reducing agent supply device to the exhaust passage becomes small when the excess air ratio of the exhaust gas during the regeneration is small, as compared to when the excess air ratio of the exhaust gas during the regeneration is large, and
the control device controls the reducing agent supply device in such a manner that a variation rate of a supply quantity of the reducing agent for SCR with respect to the excess air ratio of the exhaust gas becomes large when the excess air ratio of the exhaust gas during the regeneration control is large, as compared to when the excess air ratio of the exhaust gas during the regeneration control is small.

2. An engine with an exhaust emission control device, the engine comprising:
an engine body;
a cylinder formed in the engine body;
an exhaust passage through which an exhaust gas discharged from the engine body flows;
an NOx catalyst provided in the exhaust passage;
an SCR catalyst provided downstream from the NOx catalyst;
an excess air ratio change device configured to change an excess air ratio of the exhaust gas;
a reducing agent supply device configured to supply a reducing agent for SCR including a material for NH3 or NH3 between the NOx catalyst and the SCR catalyst in the exhaust passage; and
a control device configured to control the excess air ratio change device and the reducing agent supply device, the control device being configured to execute regeneration control to regenerate the NOx catalyst by setting the excess air ratio of the exhaust gas at 1 or less by the excess air ratio change device,
wherein the control device controls the reducing agent supply device in such a manner that a quantity of the reducing agent for SCR to be supplied from the reducing agent supply device to the exhaust passage becomes small when the excess air ratio of the exhaust gas during the regeneration is small, as compared to when the excess air ratio of the exhaust gas during the regeneration is large,
the control device controls the reducing agent supply device to make the quantity of the reducing agent for SCR to be supplied from the reducing agent supply device to the exhaust passage smaller in a period after the regeneration control is finished until a predetermined period elapses, than in a period after the predetermined period elapses after the regeneration control is finished,
the control device estimates $NH_3$ release start time that is time when $NH_3$ starts to release from the NOx catalyst following start of the regeneration control, and estimates a total quantity of $NH_3$ released from the NOx catalyst in a period from the $NH_3$ release start time to end time of the regeneration control, and the control device controls the reducing agent supply device in such a manner that the quantity of the reducing agent for SCR to be supplied from the reducing agent supply device to the exhaust passage in a period after the regeneration control is finished until the predetermined period elapses becomes small when the estimated total quantity of released $NH_3$ is large, as compared to when the estimated total quantity of released $NH_3$ is small.

3. An engine with an exhaust emission control device, the engine comprising:
an engine body;
a cylinder formed in the engine body;
an exhaust passage through which an exhaust gas discharged from the engine body flows;
an NOx catalyst provided in the exhaust passage;
an SCR catalyst provided downstream from the NOx catalyst;
an excess air ratio change device configured to change an excess air ratio of the exhaust gas;
a reducing agent supply device configured to supply a reducing agent for SCR including a material for $NH_3$ or $NH_3$ between the NOx catalyst and the SCR catalyst in the exhaust passage; and
a control device configured to control the excess air ratio change device and the reducing agent supply device, the control device being configured to execute regeneration control to regenerate the NOx catalyst by setting the excess air ratio of the exhaust gas at 1 or less by the excess air ratio change device, wherein
during the regeneration control, the control device estimates a stored oxygen decreasing speed that is a speed at which oxygen stored in the NOx catalyst decreases, and the control device controls the reducing agent supply device in such a manner that a quantity of the reducing agent for SCR to be supplied from the reducing agent supply device to the exhaust passage becomes small when the stored oxygen decreasing speed is high, as compared to when the stored oxygen decreasing speed is low, the control device calculates the stored oxygen decreasing speed based on the excess air ratio of the exhaust gas and a flow rate of the exhaust gas, and the control device calculates the stored oxygen decreasing speed by equation (1) below:

$$MreO2=(1-\lambda)\times Mex \ldots \qquad (1)$$

wherein the stored oxygen decreasing speed is MreO2, the excess air ratio of the exhaust gas is $\lambda$, and the flow rate of the exhaust gas is Mex.

4. The engine with the exhaust emission control device according to claim 3, wherein
the control device multiplies a value calculated by the equation (1) by a correction coefficient to correct the stored oxygen decreasing speed calculated by the equation (1), and
the correction coefficient is set to increase as the excess air ratio of the exhaust gas decreases.

5. The engine with the exhaust emission control device according to claim 4, wherein
the correction coefficient is set to increase as a temperature of the NOx catalyst increases.

6. The engine with the exhaust emission control device according to claim 4, wherein
the correction coefficient is set to increase as the flow rate of the exhaust gas decreases.

\* \* \* \* \*